US010868712B1

(12) United States Patent
Hutz

(10) Patent No.: US 10,868,712 B1
(45) Date of Patent: *Dec. 15, 2020

(54) COOPERATIVE MONITORING NETWORKS

(71) Applicant: Alarm.com Incorporated, Tysons, VA (US)

(72) Inventor: David James Hutz, Herndon, VA (US)

(73) Assignee: Alarm.com Incorporated, Tysons, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/443,333

(22) Filed: Jun. 17, 2019

Related U.S. Application Data

(63) Continuation of application No. 15/870,463, filed on Jan. 12, 2018, now Pat. No. 10,326,644, which is a
(Continued)

(51) Int. Cl.
*G08B 29/00* (2006.01)
*H04L 12/24* (2006.01)
(Continued)

(52) U.S. Cl.
CPC ...... *H04L 41/0686* (2013.01); *G08B 21/0202* (2013.01); *G08B 25/016* (2013.01);
(Continued)

(58) Field of Classification Search
CPC ............. H04L 41/0686; H04L 41/0681; H04L 12/2803; H04W 4/02; H04K 3/222;
(Continued)

(56) References Cited

U.S. PATENT DOCUMENTS 6,956,478 B2   10/2005   Oyagi et al.
6,975,220 B1 * 12/2005   Foodman ......... G08B 13/19645
                                              340/531
(Continued)

*Primary Examiner* — Anh V La
(74) *Attorney, Agent, or Firm* — Fish & Richardson P.C.

(57) ABSTRACT

An electronic monitoring system is described that receives data from a particular monitoring system, receives data from multiple other monitoring systems, analyzes data received from the particular monitoring system irrespective of data received from the multiple other monitoring systems, based on the analysis, determines whether one or more events occur at the particular environment, and in response to determining that a particular event occurs at the particular environment, evaluates the particular event against a set of rules, selects, based on the evaluation results, a particular subset of the multiple other monitoring systems to serve as a cooperative monitoring network, assesses data received from the particular monitoring system with data received from the particular subset of the multiple other monitoring systems, based on the assessment, tracks, in connection with the particular event, events detected by the particular subset of the multiple other monitoring systems, and handles the particular event based on the tracked events detected by the particular subset of the multiple other monitoring systems.

20 Claims, 11 Drawing Sheets

Related U.S. Application Data continuation of application No. 15/153,459, filed on May 12, 2016, now Pat. No. 9,871,692.

(60) Provisional application No. 62/160,269, filed on May 12, 2015.

(51) Int. Cl.
| | | |
|---|---|---|
| *H04K 3/00* | (2006.01) | |
| *H04W 4/02* | (2018.01) | |
| *G08B 21/02* | (2006.01) | |
| *G08B 25/01* | (2006.01) | |

(52) U.S. Cl.
CPC ......... *H04K 3/222* (2013.01); *H04L 41/0681* (2013.01); *H04W 4/02* (2013.01)

(58) Field of Classification Search
CPC .. G08B 21/0202; G08B 25/016; G08B 29/02; G08B 25/14; G08B 29/185; G08B 29/04; G08B 21/18; G08B 27/005; G08B 13/19656; G08B 13/19663; G08B 27/003; G08B 25/005; G08B 25/006; G08B 21/0269; G08B 21/24; G05B 23/00; G06Q 10/20; G07C 9/00103; G07C 9/00111
USPC ......... 340/506, 540, 573.1, 541, 522, 545.1, 340/573.4, 517, 521
See application file for complete search history.

(56) References Cited

U.S. PATENT DOCUMENTS

| | | | |
|---|---|---|---|
| 7,589,626 | B2 | 9/2009 | Hane |
| 9,871,692 | B1 | 1/2018 | Hutz |
| 10,326,644 | B1* | 6/2019 | Hutz ..................... H04K 3/222 |
| 2007/0090944 | A1 | 4/2007 | Du Breuil |
| 2007/0133356 | A1 | 6/2007 | O'Connor |
| 2012/0092161 | A1* | 4/2012 | West ................... G08B 25/005 340/540 |
| 2015/0325107 | A1* | 11/2015 | Poder .................. G08B 25/001 340/506 |

* cited by examiner

| Event | Cooperative Monitoring Network Response | Adaptation Scheme | Potential Participants |
|---|---|---|---|
| Intrusion | Analyze camera feeds; analyze motion sensing data; activate flood lighting; alert other users | Modify to track entities of interest | All consenting |
| Medical Emergency | Alert other users | Geographical cascading every 5 minutes; occupied homes only | All consenting |
| Movement Detected Near Back Door | Analyze camera feed of Houses X and Y; activate lighting inside Houses Y and Z | N/A | House X, House Y, and House Z |
| Duress Input to Mobile Device | Analyze camera feeds; alert other users | N/A | All consenting within 100 yards of the location of the mobile device |
| Cellular Communication Failure | Analyze operational status of cellular communications | N/A | Homeowner's Association |
| Package Delivered while Home is Unoccupied | Alert House Y | N/A | House Y |

User Preferences for Monitoring System of House #1

*Property-Specific Events for House #1* ⟵ 710

- *"Kitchen Fire"* if:
  - smoke detector #2 detects smoke for > 3 consecutive minutes.

- *"Broken Solar Panel"* if:
  - output of solar panel #1 is < .002 V for > 10 consecutive minutes.

- *"Minimal Cell Tower Coverage"* if:
  - > 1 components using cellular communication protocols simultaneously experience malfunctions.

- *"Intruder"* if:
  - movement is detected by IR motion sensor #4.

*Cooperative Events* ⟵ 720

- *"False Alarm"* if:
  - output of solar panel #1 of House #1 is < .002 V for > 10 consecutive minutes, AND
  - output of solar panel #5 of House #2 is < .008 V for > 10 consecutive minutes.

- *"Cell Channel Jammed"* if:
  - > 1 components of House #1 using cellular communication protocols simultaneously experience malfunctions, AND
  - any components of House #3 using cellular communication protocols experience malfunctions, AND
  - > 1 components of House #5 using cellular communication protocols simultaneously experience malfunctions.

- *"Suspicious Person"* if:
  - *Intruder* event is detected at House #1 within the past hour, AND
  - movement is detected by IR motion sensor #3 of House #4, AND
  - feed from camera #8 of House #6 shows a person.

COOPERATIVE MONITORING NETWORKS

CROSS REFERENCE TO RELATED APPLICATIONS

The present application is a continuation of U.S. patent application Ser. No. 15/870,463, filed Jan. 12, 2018, now allowed, which is a continuation of U.S. patent application Ser. No. 15/153,459, filed May 12, 2016, now U.S. Pat. No. 9,871,692, issued Jan. 16, 2018, which claims the benefit of U.S. Provisional Application No. 62/160,269, filed May 12, 2015. The contents of the prior applications are incorporated herein by reference in their entirety for all purposes.

TECHNICAL FIELD

This disclosure relates to cooperative monitoring networks.

BACKGROUND

Many people equip homes and businesses with monitoring systems to provide increased security and automation for their homes and businesses. Monitoring systems may include control panels that a person may use to control operation of the monitoring system, sensors that monitor for security breaches, and devices located within the property. In response to a monitoring system detecting a security breach, the monitoring system may generate an audible alert and, if the monitoring system is monitored by a monitoring service, the monitoring system may send electronic data to the monitoring service to alert the monitoring service of the security breach.

SUMMARY

Techniques are described for cooperative monitoring networks.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DESCRIPTION OF DRAWINGS

FIG. 6 illustrates example rules for forming cooperative monitoring networks.

FIG. 7 illustrates an example user interface.

DETAILED DESCRIPTION

Techniques are described herein for cooperative monitoring networks that are capable of monitoring and responding to events on a variety of scales. The techniques may involve a system that detects an event, such as an alarm event, at one or more existing monitoring systems. The system may evaluate the detected event against a set of rules associated with the particular monitoring system at which the event was detected and one or more other monitoring systems that may be located nearby the particular monitoring system.

In some implementations, the system may determine based on the results of the evaluation to form a cooperative monitoring network between the particular monitoring system and at least one of the one or more other monitoring systems. The cooperative monitoring network activated by the system may allow for data, such as alerts, to be shared amongst its monitoring systems. Such monitoring functions included in the cooperative monitoring network may function in cooperation with one another so as to coordinate network-wide monitoring on events that may be of importance to, for instance, the particular neighborhood or region of which the cooperative monitoring network has been activated.

Figure 1:
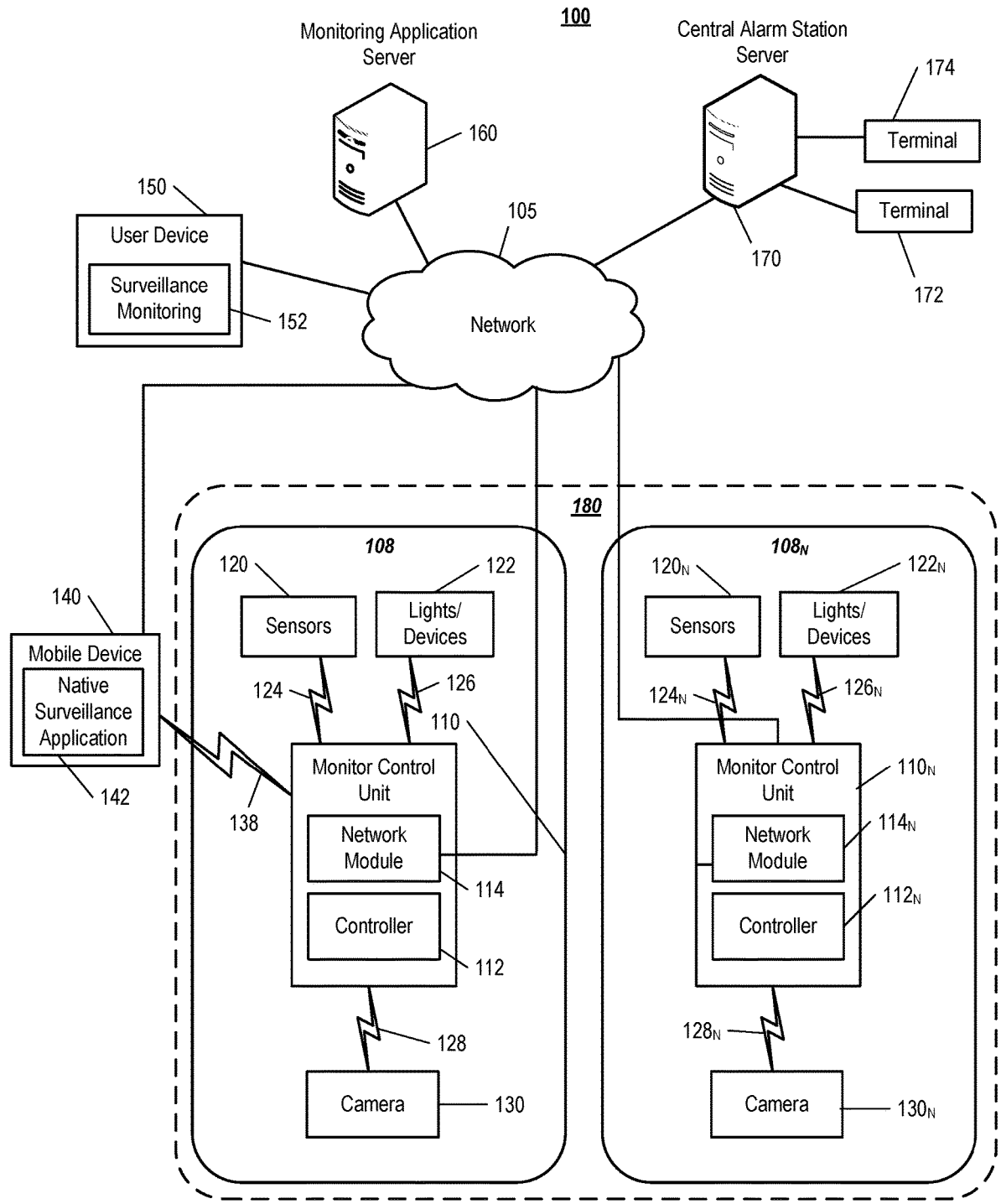
FIG. 1 illustrates an example system.

FIG. 1 illustrates an example of an electronic system 100 configured to provide various scales of monitoring capabilities by activating and modifying cooperative monitoring networks using multiple existing monitoring systems. The electronic system 100 includes a network 105, a monitoring system control unit 110, one or more user devices 140, 150, a monitoring application server 160, and a central alarm station server 170. In some examples, the network 105 facilitates communications between the monitoring system control unit 110, the one or more user devices 140, 150, the monitoring application server 160, and the central alarm station server 170.

The network 105 is configured to enable exchange of electronic communications between devices connected to the network 105. For example, the network 105 may be configured to enable exchange of electronic communications between the monitoring system control unit 110, the one or more user devices 140, 150, the monitoring application server 160, and the central alarm station server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system 108 (e.g., a home alarm or security system) that includes the monitoring system control unit 110. The premises monitored by monitoring system 108 may, for example, be a home, business, lot of land, or the like. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, ZigBee/ 802.15.4, Z-Wave, Bluetooth, WiFi, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the alarm panel to communicate over the telephone lines of Plain Old Telephone Systems (POTS).

The monitoring system that includes the monitoring system control unit 110 includes one or more sensors or detectors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 may include a radio-frequency identification (RFID) sensor that identifies a particular article that includes a pre-assigned RFID tag.

The monitoring system control unit 110 communicates with the module 122 and the camera 130 to perform surveillance, monitoring, and/or control operations. The module 122 is connected to one or more lighting systems and/or one or more household devices (e.g., thermostat, oven, range, etc.) and is configured to control operation of the one or more lighting systems and/or the one or more household devices. The module 122 may control the one or more lighting systems and/or the one or more household devices based on commands received from the monitoring system control unit 110. For instance, the module 122 may cause a lighting system to illuminate an area to provide a better image of the area when captured by a camera 130. The module 122 also may control the one or more lighting systems and/or the one or more household devices to perform energy management and/or user convenience operations (e.g., adjusting a temperature setting of a thermostat and turning an oven off and on to meet energy management and user convenience goals).

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110.

The camera 130 may be triggered by several different types of techniques. For instance, a Passive Infra Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a "normally open" or "normally closed" digital input that can trigger capture of one or more images when external sensors (e.g., the sensors 120, PIR, door/window, etc.) detect motion or other events. In some implementations, the camera 130 receives a command to capture an image when external devices detect motion or another potential alarm event. The camera 130 may receive the command from the controller 112 or directly from one of the sensors 120.

In some examples, the camera 130 triggers integrated or external illuminators (e.g., Infra Red, Z-wave controlled "white" lights, lights controlled by the module 122, etc.) to improve image quality when the scene is dark. An integrated or separate light sensor may be used to determine if illumination is desired and may result in increased image quality.

The camera 130 may be programmed with any combination of time/day schedules, system "arming state", or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitoring control unit 110. The camera 130 may employ a small solar cell to recharge the battery when light is available. Alternatively, the camera 130 may be powered by the controller's 112 power supply if the camera 130 is co-located with the controller 112.

The sensors 120, the module 122, and the camera 130 communicate with the controller 112 over communication links 124, 126, and 128. The communication links 124, 126, and 128 may include a wired or wireless data pathway configured to transmit signals from the sensors 120, the module 122, and the camera 130 to the controller 112. The sensors 120, the module 122, and the camera 130 may continuously transmit sensed values to the controller 112, periodically transmit sensed values to the controller 112, or transmit sensed values to the controller 112 in response to a change in a sensed value.

The communication link 128 over which the camera 130 and the controller 112 communicate may include a local network. The camera 130 and the controller 112 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network. In some implementations, the camera 130 and the controller 112 may communicate over network 105. That is, one or more nodes of network 105 may be included along communication link 128.

The monitoring application server 160 is an electronic device configured to provide monitoring services by exchanging electronic communications with the monitoring system control unit 110, the one or more user devices 140, 150, and the central alarm station server 170 over the network 105. For example, the monitoring application server 160 may be configured to monitor events (e.g., alarm events) generated by the monitoring system control unit 110. In this example, the monitoring application server 160 may exchange electronic communications with the network module 114 included in the monitoring system control unit 110 to receive information regarding events (e.g., alarm events) detected by the monitoring system control unit 110. The monitoring application server 160 also may receive information regarding events (e.g., alarm events) from the one or more user devices 140, 150.

In some examples, the monitoring application server 160 may route alarm data received from the network module 114 or the one or more user devices 140, 150 to the central alarm station server 170. For example, the monitoring application server 160 may transmit the alarm data to the central alarm station server 170 over the network 105.

The monitoring application server 160 may store sensor and image data received from the monitoring system and perform analysis of sensor and image data received from the monitoring system. Based on the analysis, the monitoring application server 160 may communicate with and control aspects of the monitoring system control unit 110 or the one or more user devices 140, 150.

The central alarm station server 170 is an electronic device configured to provide alarm monitoring service by exchanging communications with the monitoring system control unit 110, the one or more mobile devices 140, 150, and the monitoring application server 160 over the network 105. For example, the central alarm station server 170 may be configured to monitor alarm events generated by the monitoring system control unit 110. In this example, the central alarm station server 170 may exchange communications with the network module 114 included in the monitoring system control unit 110 to receive information regarding alarm events detected by the monitoring system control unit 110. The central alarm station server 170 also may receive information regarding alarm events from the one or more mobile devices 140, 150.

The central alarm station server 170 is connected to multiple terminals 172 and 174. The terminals 172 and 174 may be used by operators to process alarm events. For example, the central alarm station server 170 may route alarm data to the terminals 172 and 174 to enable an operator to process the alarm data. The terminals 172 and 174 may include general-purpose computers (e.g., desktop personal computers, workstations, or laptop computers) that are configured to receive alarm data from a server in the central alarm station server 170 and render a display of information based on the alarm data. For instance, the controller 112 may control the network module 114 to transmit, to the central alarm station server 170, alarm data indicating that a sensor 120 detected a door opening when the monitoring system was armed. The central alarm station server 170 may receive the alarm data and route the alarm data to the terminal 172 for processing by an operator associated with the terminal 172. The terminal 172 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 172 and 174 may be mobile devices or devices designed for a specific function. Although FIG. 1 illustrates two terminals for brevity, actual implementations may include more (and, perhaps, many more) terminals.

The one or more user devices 140, 150 are devices that host and display user interfaces. For instance, the user device 140 is a mobile device that hosts one or more native applications (e.g., the native surveillance application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a native surveillance application 142. The native surveillance application 142 refers to a software/firmware program running on the corresponding mobile device that enables the user interfaces and features described throughout. The user device 140 may load or install the native surveillance application 142 based on data received over a network or data received from local media. The native surveillance application 142 runs on mobile devices platforms, such as iPhone, iPod touch, Blackberry, Google Android, Windows Mobile, etc. The native surveillance application 142 enables the user device 140 to receive and process image and sensor data from the monitoring system.

The user device 150 may be a general-purpose computer (e.g., a desktop personal computer, a workstation, or a laptop computer) that is configured to communicate with the monitoring application server 160 and/or the monitoring system control unit 110 over the network 105. The user device 150 may be configured to display a surveillance monitoring user interface 152 that is generated by the user device 150 or generated by the monitoring application server 160. For example, the user device 150 may be configured to display a user interface (e.g., a web page) provided by the monitoring application server 160 that enables a user to perceive images captured by the camera 130 and/or reports related to the monitoring system. Although FIG. 1 illustrates two user devices for brevity, actual implementations may include more (and, perhaps, many more) or fewer user devices.

In some implementations, the one or more user devices 140, 150 communicate with and receive monitoring system data from the monitoring system control unit 110 using the communication link 138. For instance, the one or more user devices 140, 150 may communicate with the monitoring system control unit 110 using various local wireless protocols such as wifi, Bluetooth, zwave, zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring application server 160) may be significantly slower.

Although the one or more user devices 140, 150 are shown as communicating with the monitoring system control unit 110, the one or more user devices 140, 150 may communicate directly with the sensors and other devices controlled by the monitoring system control unit 110. In some implementations, the one or more user devices 140, 150 replace the monitoring system control unit 110 and perform the functions of the monitoring system control unit 110 for local monitoring and long range/offsite communication.

In other implementations, the one or more user devices 140, 150 receive monitoring system data captured by the monitoring system control unit 110 through the network 105. The one or more user devices 140, 150 may receive the data from the monitoring system control unit 110 through the network 105 or the monitoring application server 160 may relay data received from the monitoring system control unit 110 to the one or more user devices 140, 150 through the network 105. In this regard, the monitoring application server 160 may facilitate communication between the one or more user devices 140, 150 and the monitoring system.

In some implementations, the one or more user devices 140, 150 may be configured to switch whether the one or more user devices 140, 150 communicate with the monitoring system control unit 110 directly (e.g., through link 138) or through the monitoring application server 160 (e.g., through network 105) based on a location of the one or more user devices 140, 150. For instance, when the one or more user devices 140, 150 are located close to the monitoring system control unit 110 and in range to communicate directly with the monitoring system control unit 110, the one or more user devices 140, 150 use direct communication. When the one or more user devices 140, 150 are located far from the monitoring system control unit 110 and not in range to communicate directly with the monitoring system control unit 110, the one or more user devices 140, 150 use communication through the monitoring application server 160.

Although the one or more user devices 140, 150 are shown as being connected to the network 105, in some implementations, the one or more user devices 140, 150 are not connected to the network 105. In these implementations, the one or more user devices 140, 150 communicate directly with one or more of the monitoring system components and no network (e.g., Internet) connection or reliance on remote servers is needed.

In some implementations, the one or more user devices 140, 150 are used in conjunction with only local sensors and/or local devices in a house. In these implementations, the system 100 only includes the one or more user devices 140, 150, the sensors 120, the module 122, and the camera 130. The one or more user devices 140, 150 receive data directly from the sensors 120, the module 122, and the camera 130 and sends data directly to the sensors 120, the module 122, and the camera 130. The one or more user devices 140, 150 provide the appropriate interfaces/processing to provide visual surveillance and reporting.

In other implementations, the system 100 further includes network 105 and the sensors 120, the module 122, and the camera 130 are configured to communicate sensor and image data to the one or more user devices 140, 150 over network 105 (e.g., the Internet, cellular network, etc.). In yet another implementation, the sensors 120, the module 122, and the camera 130 (or a component, such as a bridge/router) are intelligent enough to change the communication pathway from a direct local pathway when the one or more user devices 140, 150 are in close physical proximity to the sensors 120, the module 122, and the camera 130 to a pathway over network 105 when the one or more user devices 140, 150 are farther from the sensors 120, the module 122, and the camera 130. In some examples, the system leverages GPS information from the one or more user devices 140, 150 to determine whether the one or more user devices 140, 150 are close enough to the sensors 120, the module 122, and the camera 130 to use the direct local pathway or whether the one or more user devices 140, 150 are far enough from the sensors 120, the module 122, and the camera 130 that the pathway over network 105 is required. In other examples, the system leverages status communications (e.g., pinging) between the one or more user devices 140, 150 and the sensors 120, the module 122, and the camera 130 to determine whether communication using the direct local pathway is possible. If communication using the direct local pathway is possible, the one or more user devices 140, 150 communicate with the sensors 120, the module 122, and the camera 130 using the direct local pathway. If communication using the direct local pathway is not possible, the one or more user devices 140, 150 communicate with the sensors 120, the module 122, and the camera 130 using the pathway over network 105.

In some implementations, the system 100 provides end users with access to images captured by the camera 130 to aid in decision making. The system 100 may transmit the images captured by the camera 130 over a wireless WAN network to the user devices 140, 150. Because transmission over a wireless WAN network may be relatively expensive, the system 100 uses several techniques to reduce costs while providing access to significant levels of useful visual information.

In some implementations, a state of the monitoring system and other events sensed by the monitoring system may be used to enable/disable video/image recording devices (e.g., the camera 130). In these implementations, the camera 130 may be set to capture images on a periodic basis when the alarm system is armed in an "Away" state, but set not to capture images when the alarm system is armed in a "Stay" state or disarmed. In addition, the camera 130 may be triggered to begin capturing images when the alarm system detects an event, such as an alarm event, a door opening event for a door that leads to an area within a field of view of the camera 130, or motion in the area within the field of view of the camera 130. In other implementations, the camera 130 may capture images continuously, but the captured images may be stored or transmitted over a network when needed.

In some implementations, the system 100 may further include a monitoring system 108N. The premises monitored by monitoring system 108N may, for example, be a home, business, lot of land, or the like. In some implementations, the premises monitored by monitoring system 108N may neighbor the premises monitored by the monitoring system 108. The monitoring system 108N may function in a manner substantially similar to monitoring system 108 as described above.

The monitoring application server 160 and central alarm station server 170 may provide monitoring services to the monitoring system 108N independent from the monitoring services provided to monitoring system 108. That is, the monitoring system 108 and the monitoring system 108N may communicate with common nodes in network 105, but may function independent from each other, as they are two separate systems. However, in certain situations the system 100 may effectively unite the monitoring system 108 and monitoring system 108N such that a monitoring service can be provided for the premises monitored by both monitoring systems as a whole. In this way, the monitoring system 108 and monitoring system 108N may together form a cooperative monitoring network 180. In other words, the capabilities of both the monitoring system 108 and monitoring system 108N may be combined to monitor and respond to events on a neighborhood-wide scale. This may allow neighbors to be made aware of nearby alarm events so that they may be able to take necessary precautions or come to the aid of another neighbor in harm's way.

The monitoring system 108 and monitoring system 108N may be "unified" from the perspective of the monitoring application server 160 and/or central alarm station server 170 in response to detection of an alarm event at the premises monitored by either monitoring system. In some implementations, the monitoring application server 160 and/or central alarm station server 170 may associate monitoring system 108N with monitoring system 108 to activate cooperative monitoring network 180 in response to the detection of an alarm event in response to determining that an alarm has been sounded at the home monitored by monitoring system 108, but has not been disarmed within a predetermined period of time. The cooperative monitoring network 180 may be of a modular design in that monitoring systems within a same neighborhood may be added and removed from the cooperative monitoring network 180 as needed.

The monitoring application server 160 and/or central alarm station server 170 may follow a set of cross-system rules that define the different circumstances under which cooperative monitoring networks are to be formed and various relationships between monitoring systems within each cooperative monitoring network. For instance, cooperative monitoring networks may be initially formed to include monitoring systems that are in close proximity to one another. In this example, the monitoring application server 160 and/or central alarm station server 170 may determine that monitoring system 108 is most closely-located to monitoring system 108N, and therefore select monitoring system 108N when activating cooperative monitoring network 180 in response to detection of a particular alarm condition in monitoring system 108.

Upon activating the cooperative monitoring network 180, the monitoring application server 160 and/or central alarm station server may utilize sensors 120-120N, lights/devices 122-122N, and cameras 130-130N to monitor and respond to events at both premises. For example, the cross-system rules may specify that one or more lights 122N be activated in response to an alarm event detected at the neighboring premises monitored by monitoring system 108.

Similarly, the data output by sensors 120 and cameras 130 may be considered and handled by the monitoring application server 160 and central alarm station server 170 in conjunction with the data output by sensors 120N and cameras 130N. This may allow the monitoring application server 160 and central alarm station server 170 to more effectively track and evaluate alarm events. For example, the cross-system rules may specify that images from a house's outdoor cameras may be recorded in response to an alarm event at a neighbor's house. The cross-system rules may further associate images captured by cameras 130 with those captured by cameras 130N. By considering these images in tandem, the monitoring application server 160 and/or central alarm station server 170 may be able to surveil events from multiple viewpoints and track entities of interest.

In some implementations, the monitoring application server 160 and central alarm station server 170 may form and grow a cooperative monitoring network in a cascading manner. For example, the monitoring application server 160 and central alarm station server 170 may initially form a cooperative monitoring network with the monitoring systems of two next door neighbors. In this example, the cooperative monitoring network may be activated in response to detecting an alarm event at a home in order to provide an alarm notification to their immediate neighbors. By alerting an immediate neighbor, help or assistance may be more easily provided in a short amount of time. In some examples, the monitoring application server 160 and central alarm station server 170 may grow the cooperative monitoring network to provide alarm notifications to neighbors that are farther away if one of the immediate neighbors does not indicate that they are handling the alarm within a predetermined period of time. The monitoring application server 160 and central alarm station server 170 may continue to periodically grow the cooperative monitoring network to provide cascading alarm notifications to spread awareness of the alarm event throughout the neighborhood until one or more of the alarm notification recipients indicates that they are handling the alarm. In some implementations, the last recipient of an alarm notification may be a paid responder. In this way, a paid responder is only tasked with handling issues of relatively high severity. In some implementations, the cascading alarm notifications may only be provided to those who have been determined to be in their home at the time of the alarm event.

Figure 2A:
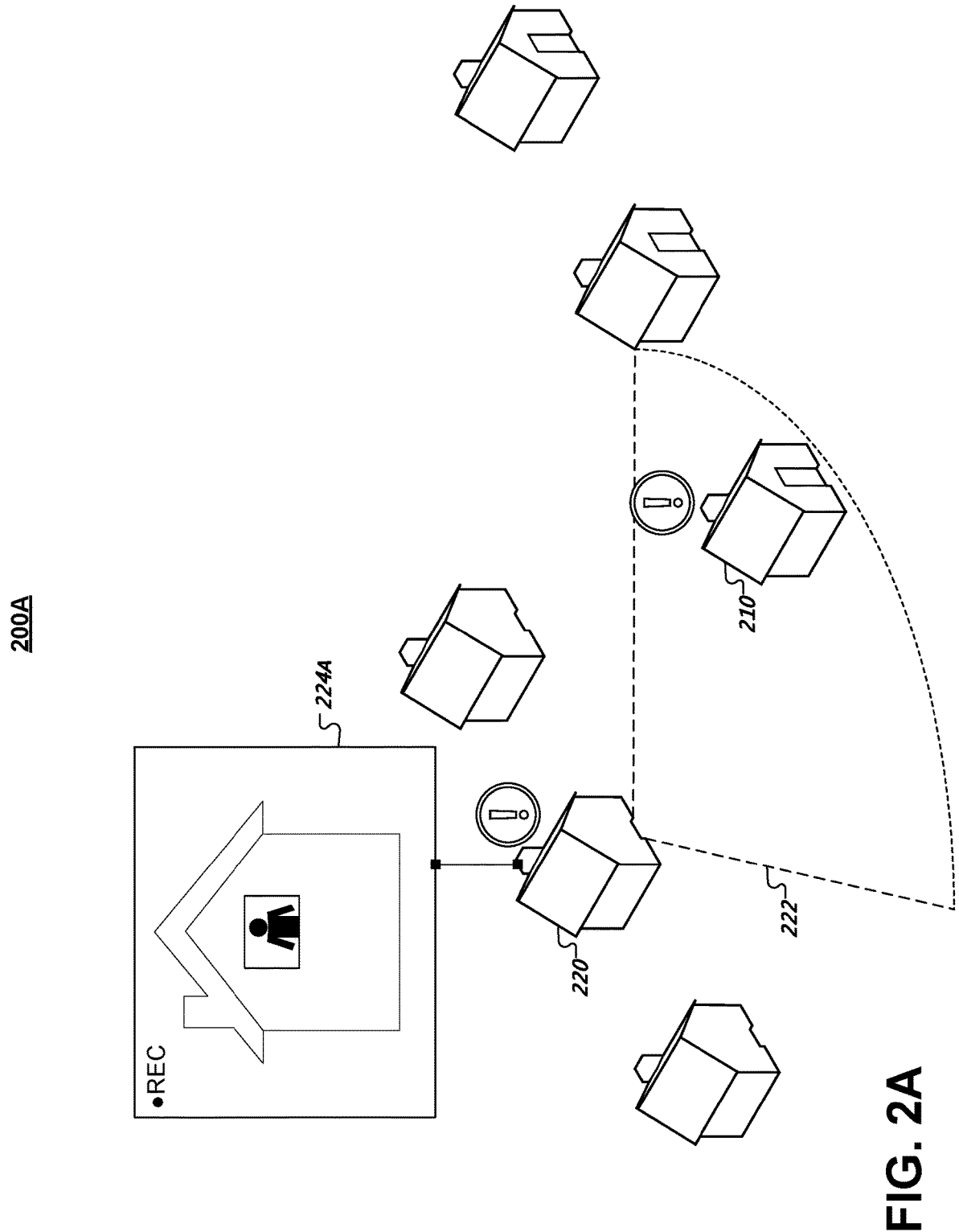
FIGS. 2A, 2B, 2C, 3, and 4 illustrate exemplary frameworks for cooperative monitoring networks configured to provide monitoring functions to a community.
Figure 2B:
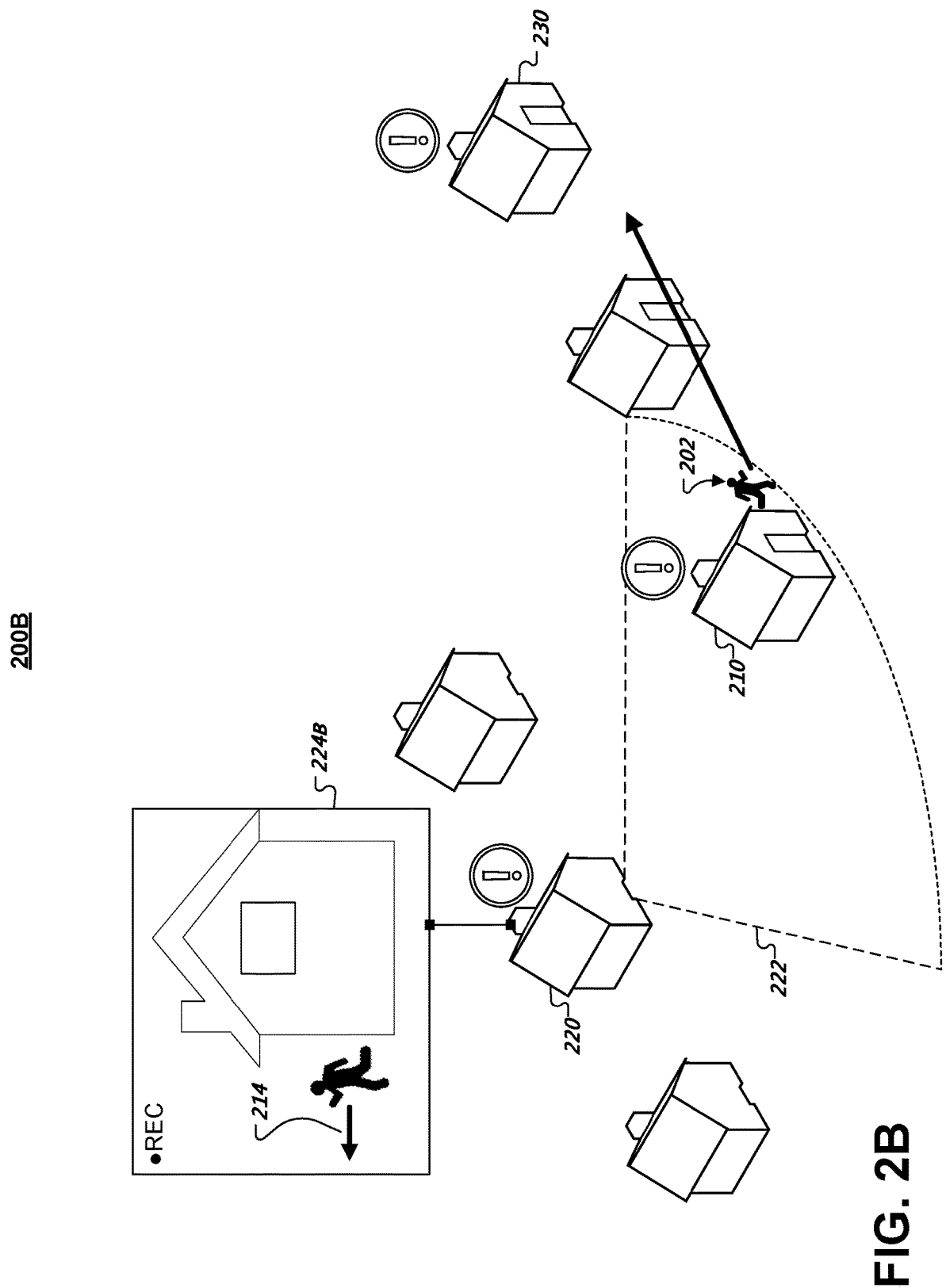
Figure 2C:
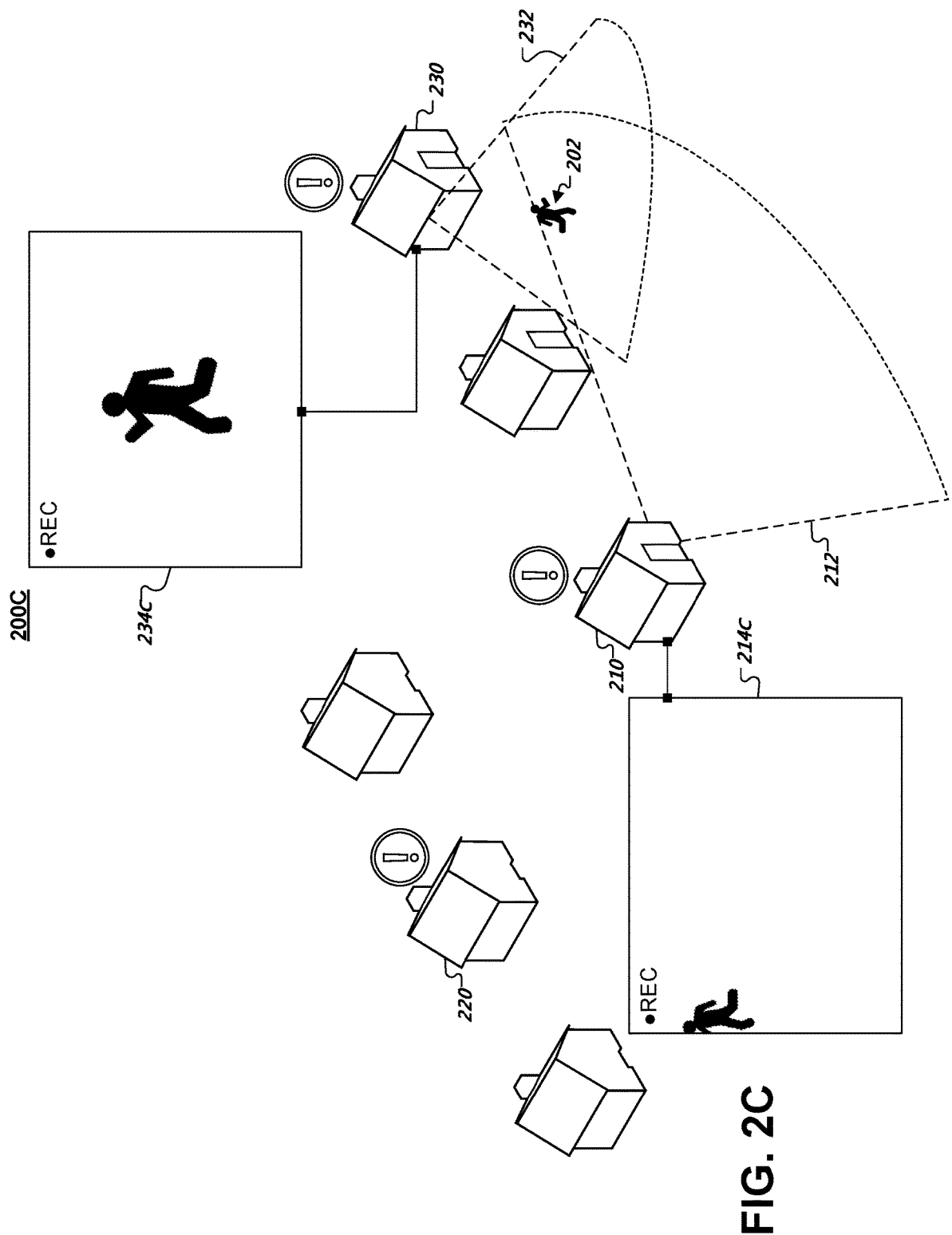

FIGS. 2A-C illustrate an exemplary framework 200 for a cooperative monitoring network configured to provide monitoring functions to a community, such as a neighborhood. In FIG. 2A, the framework 200A for a neighborhood watch system may include a monitoring system for premises 210 and a monitoring system for premises 220. In some implementations, the monitoring system for premises 210 and monitoring system for premises 220 may be similar to one or more of the monitoring systems described above in association with FIG. 1. The monitoring system for premises 210 may serve to sense attributes of premises 210, which may, for example, correspond to that of an environment within and/or surrounding a residence. Monitoring systems for other environments, such as the monitoring system for premises 220, may provide similar sensing and monitoring functions in their respective environment. The monitoring systems of premises 210 and 220 may, for example, be registered to different accounts that are managed by a monitoring application server and/or central alarm station server similar to those described above. That is, the users of monitoring systems of premises 210 and 220 may hold separate accounts with a security or automation service provider that operates the monitoring application server and/or central alarm station server.

In the example of FIG. 2A, an alarm event, such as a home intrusion, may be detected at the monitoring system for premises 210. Such an alarm event may, for example, be identified by a monitoring application server and/or central alarm station server similar to those described above, based on data the monitoring application server and/or central alarm station receives from the monitoring system of premises 210. The monitoring application server and/or central alarm station may identify such an alarm event that occurs at the monitoring system of premises 210 irrespective of data the monitoring application server and/or central alarm station receives from monitoring systems. That is, the monitoring application server and/or central alarm station may, by default, not take data yielded from monitoring systems that are registered to accounts other than the account to which the monitoring system of premises 210 is registered when determining whether one or more alarm events occur at premises 210.

In response to detecting this alarm event, a monitoring application server and/or central alarm station server similar to those described above may determine to activate a cooperative monitoring network with the monitoring system for premises 210 and the monitoring system for premises 220. In this way, an alert produced at premises 210 may be propagated to premises 220 to spread awareness of the alarm event throughout the community. This helps enhance the security of neighbors in the immediate area of the alarm event, as well as the residents of the home on premises 210. Upon establishing the neighborhood watch system, the monitoring systems of premises 210 and 220 may be relied upon in tandem to continue to monitor an intruder associated with the alarm event. For instance, one or more cameras belonging to the monitoring system of premises 220 may be utilized to capture images of the entity intruding premises 210. The monitoring application server and/or central alarm station server may determine that one or more cameras belonging to the monitoring system of premises 220 has a field of view 222 that includes at least a portion of premises 210 or an entity of interest to the monitoring system for premises 210. In some implementations, the monitoring application server and/or central alarm station server may specifically form the neighborhood watch system using the monitoring system for premises 220 on the basis that one or more cameras belonging to the monitoring system of premises 220 has a field of view 222 that includes at least a portion of premises 210 or an entity of interest to the monitoring system for premises 210. Such entities of interest may, for example, include persons, animals, and vehicles.

In some implementations, sensors and other devices of the monitoring system for premises 220 may be utilized selectively according to the monitoring system for premises 210. In the example of FIG. 2A, the one or more cameras with field of view 222 may capture images 224A of the intruder.

In the example of FIG. 2B, the intruder 202 has fled premises 210. The monitoring systems of premises 210 and 220 may continue to track the intruder 202 as they exit the premises. The camera of the monitoring system of premises 220 may capture images 224B of the intruder 202 fleeing in direction 214. In some implementations, the trajectory of an intruder or other entity of interest may be determined on the basis of image processing performed on one or more images captures in the monitoring environment. In some examples, one or more machine learning techniques may be leveraged so as to predict routes taken by entities on the move. The monitoring application server and/or central alarm station server may reference one or more databases that associate monitoring systems with geographical locations in order to identify one or more monitoring systems that may be of service in tracking the intruder 202. The monitoring application server and/or central alarm station server may determine that the intruder 202's movements in direction 214 indicate that the intruder 202 may become visible to a monitoring system for premises 230. For at least this reason, the monitoring application server and/or central alarm station server may add the monitoring system for premises 230 to the cooperative monitoring network. Similarly, an alarm may be propagated to the monitoring system for premises 230 to raise awareness of the intrusion. In some examples, such as those in which one or more machine learning techniques are leveraged when tracking entities, the monitoring application server and/or central alarm station server may predict the route being taken by intruder 202 based on the movements of intruder 202 and movements of other persons having previously traveled through the same region, and add the monitoring system of premises 230 to the cooperative monitoring network well before the intruder 202 approaches premises 230, based on such a prediction.

As the situation evolves, additional alarms may be provided to any of the monitoring systems for premises 210, 220, and 230. For example, an alarm may be provided to residents of premises 230 to warn them that a potentially dangerous entity is heading toward their home. In some implementations, a live video feed from one or more cameras within the cooperative monitoring network may be sent to or otherwise shared with residents of homes in the cooperative monitoring network. In addition, at least one of images of the intruder 202 (e.g., close-up shots of the intruder's face), description of the intruder 202 (e.g., suspected crime, physical appearance, etc.), and the geographical location of the intruder 202 (e.g., address, cross-street, GPS coordinates, and the like) may be provided to such residents in one or more customized alerts.

In the example of FIG. 2C, the intruder 202 has continued to flee premises 210. A camera of the monitoring system for premises 230 may be activated to track the intruder in a manner similar to that which has been described above. Similarly, images captured by a camera of the monitoring system for premises 210 may continue to be of interest for tracking purposes. In some implementations, one or more lights of monitoring systems included in neighborhood watch system may be activated to bring attention to an entity of interest and/or promote an appearance of heightened security within the neighborhood. Through the use of cameras with fields of view 212 and 232, the monitoring systems of premises 210 and 230 may continue to track the intruder 202. In the example of FIG. 2C, the cameras of the monitoring systems of premises 210 and 230 may capture images 214C and 234C of the intruder 202, respectively. In some implementations, image recognition data may be developed on the basis of images previously captured by the monitoring systems for premises 210 and 220. Such image recognition data may be used in processing images captured by the monitoring system for premises 230 or other monitoring systems added to the cooperative monitoring network. For example, one or more models or templates for recognizing the intruder 202 may be developed and adaptively improved upon as additional images of the intruder 202 are recorded from various fields of view.

If it is determined that the intruder 202 is no longer visible to the sensors of the monitoring system for premises 220, then the monitoring application server and/or central alarm station server may discontinue reliance on the camera of the monitoring system for premises 220 for tracking purposes. In this sense, the cooperative monitoring network coordinates the passing of video control to different cameras in order to obtain a complete picture of the movements of intruder 202. In some examples, the exemplary framework may continue to grow as far outward as it may need to in order to track the intruder 202 and provide a complete picture of the scene. In some implementations, some or all cameras belonging to nearby monitoring systems may be activated in a substantially simultaneous manner so as to increase the chances of capturing images of intruder 202.

Figure 3:
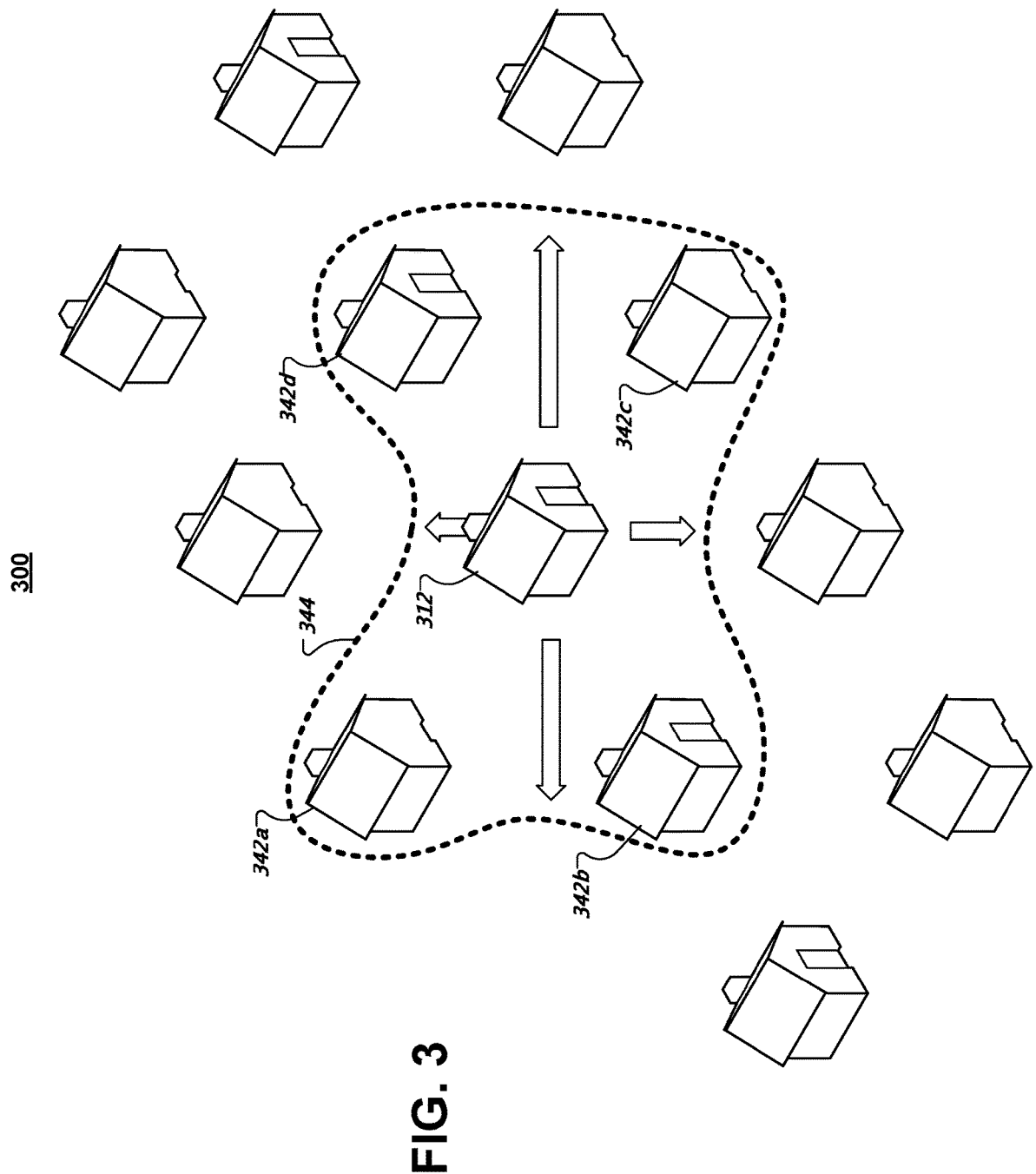

FIG. 3 illustrates an exemplary framework 300 for activating a cooperative monitoring network configured to provide monitoring functions to a community, such as a neighborhood. In this example, an alarm event may be detected at a monitoring system. For example, the alarm event may be detected at a monitoring system for premises 312. The monitoring system for premises 312 may be similar to that of one or more of the monitoring systems described in association with FIGS. 1 and 2. Data associated with the alarm event detected at monitoring system for premises 312 may be received by one or more of a monitoring application server and a central alarm station server. For example, the alarm event at monitoring system for premises 312 may have been detected on the basis of a health-monitoring sensor and indicates that a resident of premises 312 may be in need of medical attention.

The alarm event detected at the monitoring system for premises 312 may then, for example, be evaluated against a set of rules. This evaluation may be performed by one or more of the monitoring application server and central alarm station server. Such rules may define the different circumstances under which cooperative monitoring networks are to be activated and various relationships between monitoring systems within each cooperative monitoring network. In some implementations, at least a portion of the rules may be configured in accordance with user preferences provided by one or more monitoring systems. The rules may further specify monitoring systems with which to establish a cooperative monitoring network. One or more monitoring systems with which to establish a cooperative monitoring network may be selected based on one or more of their geographical proximity to premises 312, vacancy state (e.g., whether anyone is currently at home), and user preferences. In the example described above relating to the resident of premises 312 needing medical attention, the set of rules may specify that a cooperative monitoring network is to be established if a health-related alarm is raised at premises 312 and is not handled within 5 minutes. In some implementations, one or more users may be prompted to provide permission to include the monitoring system associated with their home in a cooperative monitoring network. In some examples, such a prompt may be provided to nearby users in response to an event having been detected at a monitoring system. In some implementations, the prompt described above may be provided in tandem with an alert relating to the alarm event detected. In other examples, users may preregister their monitoring system to be included in specific cooperative monitoring networks in the event that one is to be activated.

Next, it may be determined that a cooperative monitoring network is to be activated. In the present example, the evaluation results may indicate that 5 minutes have passed since the health-related alarm was raised at premises 312. Therefore, a cooperative monitoring network 344 may be activated according to the evaluation results. The rules associated with the monitoring system 312 may specify, for example, that the cooperative monitoring network is to be established with monitoring systems that are closest in proximity to premises 312, such as monitoring systems 342a, 342b, 342c, and 342d. It may further be specified that a customized alert is to be provided throughout the cooperative network 244 to indicate that the resident of premises 312 is having a medical emergency. The resident of premises 312 may have, for example, indicated in their user preferences that such medical emergency alerts be provided with additional information regarding the resident's known medical conditions. The cooperative monitoring network 344 may be further expanded in accordance with a cascading notification scheme similar to that which has been described above.

Figure 4:
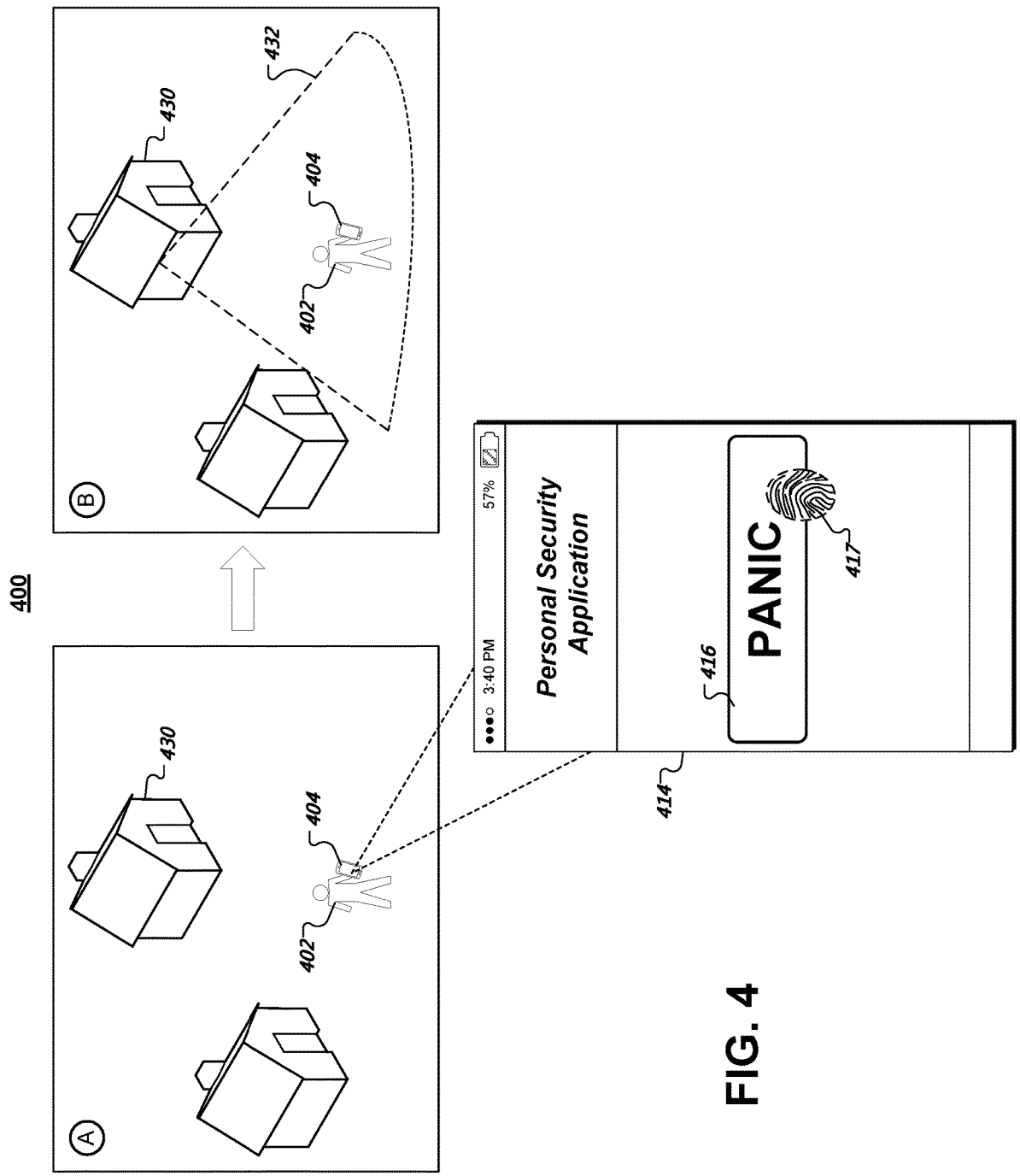

FIG. 4 illustrates an exemplary framework 400 for activating a cooperative monitoring network configured to provide personal security functions to a user of a mobile device. In this example, an alarm event may be detected at a mobile device that is similar to user device 140 and/or user device 150, as described above in reference to FIG. 1, and similarly serves as a component of a monitoring system that is associated with its user. More specifically, framework 400 includes a mobile device 404 that belongs to user 402 and communicates with a monitoring application server and/or central alarm server, as well as other components of a monitoring system that is associated with user 402. The mobile device 404, like user devices 140, 150, may run one or more applications that similar to those of native surveillance application 142 and/or surveillance monitoring application 152, as well as one or more applications that provide user 402 with security services while they are on-the-go or otherwise away from their home. The diagram also depicts user interface 414 of an application that is running on mobile device 404 and the creation of a cooperative monitoring network based input received from user 404 through the user interface 414 in time-sequenced stages "A" to "B," respectively.

As shown in FIG. 4, a personal security application that is running on mobile device 404 may provide user interface 414 when accessed by user 402. In this example, the personal security application that is running on mobile device 404 enable a monitoring application server and/or central alarm server to provide help to user 402 in response to user input being received through an input element of user interface 414, such as panic button 416. Such an input element may, for instance, enable user 402 to easily indicate to the personal security application, and thus the monitoring application server and/or central alarm server, that user 402 is, for example, under duress, in the midst of a hostile or otherwise dangerous situation, or requires emergency medical assistance.

In the example of FIG. 4, user 402 may be in possession of mobile device 404 while away from their home. In stage A, user 402 may, for example, encounter a crisis situation while walking past premises 430. For instance, a stranger may have started to physically assault user 402 at stage A. Upon encountering such a situation, user 402 may have, in this example, applied touch input 417 to the panic button 416 to signal for help. In response to the application running on mobile device 404 having received touch input 417 or other duress input from user 402, the mobile device 404 may send data to the monitoring application server and/or central alarm server over a network similar to that of network 105 as described above in reference to FIG. 1.

Once this communication is received on the backend, the monitoring application server and/or central alarm server may reference a set of rules that are associated with the account of user 402 and determine to form a cooperative monitoring network to assist with the alarm event detected at mobile device 404. In some examples, the monitoring application server and/or central alarm server may determine the location of the mobile device 404 and activate one or more monitoring systems within the vicinity of the mobile device 404. The location of the mobile device 404 may be determined on the basis of a GPS or other system that identifies the geographical location of the mobile device 404 and whose output is made available to the monitoring application server and/or central alarm server. For instance, the monitoring application server and/or central alarm server may determine that the closest monitoring system to mobile device 404 is the monitoring system of premises 430. In stage B, the monitoring application server and/or central alarm server may form a cooperative monitoring network that at least includes the monitoring system of premises 430. At this juncture, the monitoring application server and/or central alarm server may, for example, begin to assess data received from one or more components of the monitoring system of premises 430 that senses attributes of an environment 432. This data may, for instance, correspond to a feed from a camera of the monitoring system of premises 430 having field of view 432.

By considering data produced by multiple monitoring systems within a cooperative monitoring network and a same geographical area, an application server and/or central alarm station server may be able to make neighborhood-wide determinations. For instance, an application server and/or central alarm station server may be able to determine if monitoring system malfunctions such as phone line failure, power failure, or radio-frequency jamming are occurring on a neighborhood-wide scale. In some implementations, such alarm events may prompt a spontaneous formation of a cooperative monitoring network for a neighborhood. In such implementations, residents of the neighborhood may be alerted of the phone line or power status of others in their neighborhood that are considered to be part of the cooperative monitoring network. In the event that only a single home in a neighborhood is affected with a phone line or power failure, such notification may indicate to the resident of that home that the issue is localized to their home. The application server and/or central alarm station server may also be able to more accurately identify false-alarms by considering the data produced by a neighborhood as a whole. For example, if output from a solar panel at one home triggers an alarm, the output from solar panels at other homes in the neighborhood may be taken into consideration in determining whether the triggered alarm is warranted. In this example, if the solar panels from one or more other homes in the neighborhood have also triggered alarms, it may be concluded that the presence of snow or clouds may have caused a false alarm.

Figure 5:
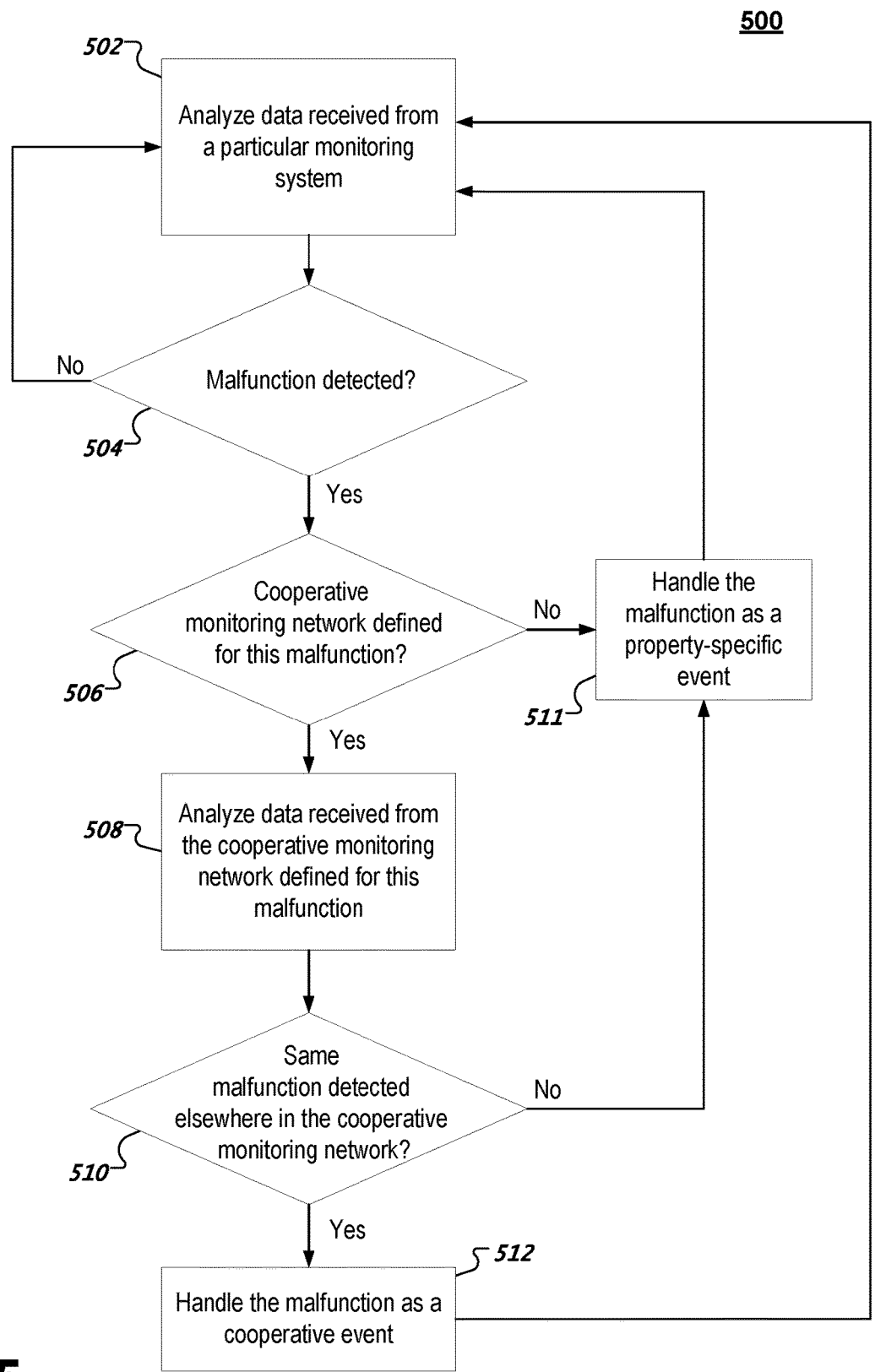
FIGS. 5, 8, and 9 depict example processes.

FIG. 5 is a flowchart of an example of a process 500 for responding to a malfunction detected at a monitoring system using a cooperative monitoring network. The following describes the process 500 as being performed by components of systems that are described with reference to FIGS. 1-4. However, the process 500 may be performed by other systems or system configurations. The process 500 may, for instance, be leveraged to address any of the malfunctions described above including phone line failure, power failure, radio-frequency communication failure, and abnormalities in readings from solar panels and other transducers.

At 502, data received from a particular monitoring system may be analyzed. With such data, the system may, at 504, determine whether any malfunctions are present. More particularly, the system may determine whether data from components of the particular monitoring system contain any flags, whether data is being received from every component in the particular monitoring system, and/or whether the values conveyed by such data deviate substantially from that of the norm or otherwise exhibit abnormalities. If no operational malfunctions are detected in the particular monitoring system, the system may simply continue to analyze the data it receives from the particular monitoring system (502).

However, in the event that an operational malfunction is detected, the system may, at 506, further determine whether a cooperative monitoring is defined for this particular operational malfunction. For example, this may correspond to the system evaluating the detected operational malfunction against a set of rules that have been defined for the particular monitoring system. If it is determined that a cooperative monitoring network is not defined for the particular operational malfunction detected, the system may, at 511, proceed to treat the operational malfunction as an isolated of "property-specific" event. For example, the system may simply provide an alert or other notification to the user associated with the particular monitoring system to bring attention to the operational malfunction detected. If, however, it is determined that a cooperative monitoring network is indeed defined for the particular operational malfunction detected, the system may, at 508, proceed to form such a cooperative monitoring network and analyze the data received from the cooperative monitoring.

At 510, the system may further determine whether other monitoring systems in the cooperative monitoring network are experiencing the same malfunction as the particular monitoring system. These determinations may, for example, be performed in a manner similar to that which has been described above at 504. In some examples, the quantity of other monitoring systems that are determined to be experiencing the same malfunction as the particular monitoring system may be compared to one or more threshold values. Such threshold values may, for instance, be specified in the user preferences of the user of the particular monitoring system. In such examples, the determination at 510 may include determining whether the quantity of other monitoring systems that are determined to be experiencing the same malfunction as the particular monitoring system satisfies the one or more threshold values. If it is determined that the same operational malfunction is not detected elsewhere in the cooperative monitoring network, or that the quantity of the same operational malfunction detected elsewhere in the cooperative monitoring network does not satisfy one or more threshold values, the system may, at 511, proceed to treat the operational malfunction as an isolated of "property-specific" event.

If, however, the system determines otherwise, the system may, at 512, proceed to treat the operational malfunction as a "cooperative" event, which may warrant a response that is different from the response to a "property-specific" event involving the same malfunction. For instance, the system may respond to a "property-specific" event involving a radio-frequency communication failure at the particular monitoring system by providing the user associated with the particular monitoring system with an alert using an alternative communication channel, while the system may respond to a "cooperative" event involving a radio-frequency communication failure at the particular monitoring system by concluding that radio-frequency communication channels used by the particular monitoring system and others in the cooperative monitoring network are being maliciously jammed, and may take one or more investigative actions. In another example, the system may respond to a "property-specific" event involving abnormal solar panel outputs at the particular monitoring system by concluding that the solar panel and/or property associated with the particular monitoring system have sustained critical damage, while the system may respond to a "cooperative" event involving abnormal solar panel outputs at the particular monitoring system by concluding that such solar panels are currently covered with snow or overshadowed by clouds, and may simply treat such operational malfunctions as a false alarm and/or take no further action.

In some implementations, an application server and/or central alarm station server may activate a cooperative monitoring network between one or more monitoring systems, such as those described above, and one or more public monitoring systems. For instance, the application server and/or central alarm station server may add a traffic camera to a cooperative monitoring network in order to continue tracking an entity of interest. In other examples, street lamps or other devices that are not specifically associated with a security system may be utilized for executing neighborhood-wide functions. In the example of the fleeing intruder, additional street lamps may be activated in order to illuminate an area where the fleeing intruder may be.

In some implementations, some or all of the processes described above in association with managing cooperative monitoring networks may be performed by the monitoring control units of each monitoring system included in a cooperative monitoring network. For instance, the monitoring control units of different monitoring systems may coordinate any of the various tasks performed by the application server and/or central alarm station server described above. In some examples, the application server and/or central alarm station server may facilitate discovery of monitoring systems that may be utilized in a cooperative monitoring network, while the monitoring control units of each monitoring system included in the cooperative monitoring network coordinate tasks to be performed by each respective monitoring system in order for the cooperative monitoring network to provide larger scale monitoring functions. In this way, cooperative monitoring networks may be self-sufficient in one or more respects.

FIG. 6 illustrates example rules 600 for forming cooperative monitoring networks. The example rules shown in FIG. 6 may be accessed in the process 500, as described above in reference to FIG. 5, as well as processes 800 and 900, as described in more detail below in reference to FIGS. 8 and 9, respectively, and used by a monitoring application server and/or central alarm server to create and modify cooperative monitoring networks in response to the detection of specified events. The example rules 600 may, in this example, represent a set of rules that have been specified by a user of an exemplary monitoring system in their user preferences, and optionally consented to by users of other monitoring systems that are referenced in the example rules 600. In some examples, a monitoring application server and/or central alarm server may access and maintain example rules 600 in association with the account of the user of the exemplary monitoring system.

As shown, the example rules 600 specify an event 601, a cooperative monitoring network response 602, an adaptation scheme 603, and potential participants 604. Each event 601 may be associated with a particular pattern exhibited in data that is output by components of the exemplary monitoring system. For example, the system may consider movement detected by an infrared proximity sensor within a particular room of a house during the hours of 1:00-2:00 PM to constitute an "intrusion" event. Each cooperative monitoring network response 602 may be representative of the actions taken by a monitoring application server and/or central alarm server in response to detecting an event 601. More specifically, each cooperative monitoring network response 602 may be represent the data received from other monitoring systems that the monitoring application server and/or central alarm server analyzes in connection with the detected event 601, as well as control signals that the monitoring application server and/or central alarm server may provide to monitoring systems in the cooperative monitoring network when handling the detected event 601. Each adaptation scheme 603 may be representative of the manner in which the monitoring application server and/or central alarm server is to modify the cooperative monitoring network. For instance, the system may modify the cooperative monitoring network as needed in order to track entities of interest in connection with a detected intrusion event. That is, the system may dynamically add and/or remove monitoring systems over time to follow an entity as they change locations. Each set of potential participants 604 may be representative of the parties (e.g., users, monitoring systems, etc.) that may potentially be included in each cooperative monitoring network. When providing such example rules 600, the user may specify particular, individual monitoring systems for inclusion in cooperative monitoring networks, and may also elect to specify a predefined group of monitoring systems for inclusion in cooperative monitoring networks, such as a group that includes all monitoring systems associated with users belonging to a homeowner's association. In some examples, the system may only form cooperative monitoring networks with the participants specified in the set of potential participants 604 if such participants have expressly consented to volunteering their monitoring systems for such purposes. The user may also, in some implementations, specify that they would prefer for all consenting participants to be included in a cooperative monitoring network, as needed. This may provide additional benefit in emergency situations of utmost criticality.

Each of rules 611-616 in the set of example rules 600 define events and the details of the cooperative monitoring network response to be executed by the monitoring application server and/or central alarm server in response to such events. For example, rule 611 specifies that, in response to detecting an intrusion event at the exemplary monitoring system for which the example rules 600 are provided, the monitoring application server and/or central alarm server activate any consenting monitoring systems, as needed, to form and maintain a cooperative monitoring network that tracks entities of interest in connection with the intrusion event using camera and motion data from such monitoring systems. The rule 611 also specifies that flood lighting components in the cooperative monitoring network be used to bring attention to the detected event as it progresses, and further specifies that alerts be provided to users of monitoring systems that are added to the cooperative monitoring network. In this way, example rule 611 can be seen as one that may be similar to one or more rules leveraged in connection with the intrusion detection response described above in reference to FIGS. 2A-C. Similarly, rule 612 can be seen as one that may be similar to one or more rules leveraged in connection with the event detection response described above in reference to FIG. 3, involving the formation of a cooperative monitoring network that is modified, over time in a cascading manner, in response to a detected medical emergency event. Rules 613-616 define other events and the details of a more simplistic response to such events in which the cooperative monitoring networks formed may not have a specified adaptation scheme.

FIG. 7 illustrates an example graphical user interface 700 that may be accessed by a user associated with a monitoring system in order to view and modify user preferences regarding property-specific events and cooperative events. A user may access graphical user interface 700 through a web browser or other application running on one or more of the client devices described herein. For instance, graphical user interface 700 may be accessible on a web site that is hosted by a security and/or automation services provider, which may operate a monitoring application server and/or central alarm server similar to those described above in reference to FIGS. 1-6.

In this example, graphical user interface 700 may present the user with a property-specific events user preferences section 710 and a cooperative events user preferences section 720. In particular, the property-specific events user preferences section 710 of the graphical user interface 700 may display each of the property-specific events that have been provided for example House #1, which may, for instance, be a property that is owned by the user of the graphical user interface 700 and equipped with components of a monitoring system that is managed by the monitoring application server and/or central alarm server. Property-specific events may, for example, be events which may be identified by the monitoring application server and/or central alarm server on the basis of data received from the monitoring system of House #1 and irrespective of data received from monitoring systems other than the monitoring system of House #1.

The user of the graphical user interface 700 may specify what constitutes each property-specific event associated with the monitoring system of House #1 by providing input to the property-specific events user preferences section 710 of graphical user interface 700. In the example of FIG. 7, it can be seen that a monitoring application server and/or central alarm server that follows the definitions of the property-specific events shown in the property-specific events user preferences section 710 of graphical user interface 700 would determine that a "kitchen fire" event has occurred within House #1 if the data received from the monitoring system of House #1 indicates that the smoke detector #2 component has detected smoke for more than two consecutive minutes. In addition, a monitoring application server and/or central alarm server that follows the definitions of the property-specific events shown in the property-specific events user preferences section 710 of graphical user interface 700 would determine that a "broken solar panel" event has occurred if it is determined that the output of the solar panel #1 component of the monitoring system of House #1 is less than 0.002 V for more than ten consecutive minutes, determine that a "minimal cell tower coverage" event has occurred if two or more components using cellular communication protocols are determined to be simultaneously experiencing malfunctions, and determine that an "intruder" event has occurred if it is determined that movement is detected by the infrared motion sensor #4 component of the monitoring system of House #1. Each of the property-specific events descried in the property-specific events user preferences section 710 of graphical user interface 700 may also be associated with one or more responses that are isolated to House #1 and its inhabitants. That is, action taken by the monitoring application server and/or central alarm server responsive to detection of a property-specific event may, in some implementations, in no way involve monitoring systems that are not registered to the same account as the monitoring system of House #1.

The cooperative events user preferences section 720 of the graphical user interface 700 may display each of the cooperative events that may be detected at other monitoring systems that are participating in a cooperative monitoring network to assist in monitoring following an event detected at the monitoring system of House #1, or that may be detected at the monitoring system of House #1 while the monitoring system of House #1 is participating in a cooperative monitoring network to assist in monitoring following an event detected at one or more of the other monitoring systems. Cooperative events may, for example, be events which may be identified by the monitoring application server and/or central alarm server on the basis of data received from the monitoring system of House #1 and data from one or more other monitoring systems in a cooperative monitoring network to which the monitoring system of House #1 is associated.

The user of the graphical user interface 700 may specify what constitutes each cooperative event associated with the monitoring system of House #1 by providing input to the cooperative events user preferences section 720 of graphical user interface 700. By defining both property-specific events and cooperative events, the monitoring application server and/or central alarm server may be able to decipher between property-specific and cooperative events that are detected at monitoring systems in an active cooperative monitoring network. That is, the events defined and presented through the graphical user interface 700 may enable the monitoring application server and/or central alarm server to determine whether an event detected at a given monitoring system in a cooperative monitoring network is to be treated as a property-specific event or a cooperative event. Such a distinction may be of importance in implementations in which the actions taken in response to detecting property-specific and cooperative events are significantly different. In some implementations, the monitoring application server and/or central alarm server that detects both a property-specific event and a cooperative event on the basis of the same data may give precedence to the cooperative event such that the monitoring application server and/or central alarm server responds to the cooperative event in the appropriate manner without responding to the property-specific event. These operations may, for example, be similar to 506 to 512 of process 500 as described above in reference to FIG. 5.

For example, a monitoring application server and/or central alarm server that only follows the definitions of the property-specific events shown in the property-specific events user preferences section 710 of graphical user interface 700 would, irrespective of the output of the monitoring system of House #2, determine that a "broken solar panel" event has occurred if it is determined that the output of the solar panel #1 component of the monitoring system of House #1 is less than 0.002 V for more than ten consecutive minutes, while a monitoring application server and/or central alarm server that follows the definitions of the cooperative events shown in the cooperative events user preferences section 720 of graphical user interface 700 in addition to the definitions of the property-specific events shown in the property-specific events user preferences section 710 of graphical user interface 700 would, in the event that the output of the solar panel #5 component of the monitoring system of House #2 has less than 0.002 V for more than ten consecutive minutes, not determine that a "broken solar panel" event has occurred if it is determined that the output of the solar panel #1 component of the monitoring system of House #1 is less than 0.002 V for more than ten consecutive minutes, but would instead determine that the abnormalities detected in the monitoring system of House #1 are nothing more than a false alarm. It can be seen that other cooperative events, such a "cell channel jammed" event and "suspicious person" event may have criteria that overlap with property-specific events, but also may yield very different conclusions and actions taken by the monitoring application server and/or central alarm server in response to the satisfaction of such criteria.

Figure 8:
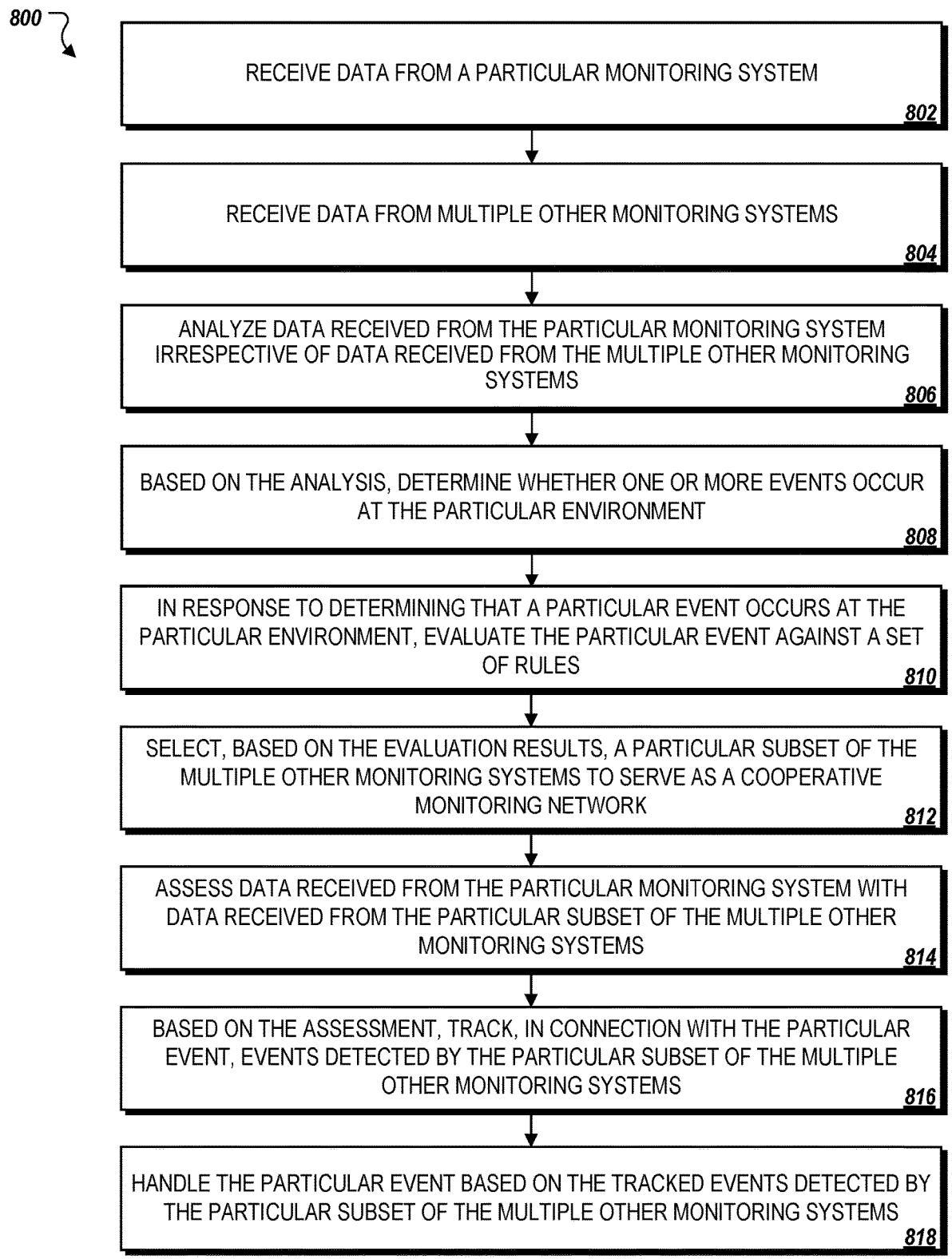

FIG. 8 is a flowchart of an example of a process 800 for responding to an event detected at a monitoring system using a cooperative monitoring network. The following describes the process 800 as being performed by components of systems that are described with reference to FIGS. 1-4. However, the process 800 may be performed by other systems or system configurations. Briefly, the process 800 may include receiving data from a particular monitoring system (802), receiving data from multiple other monitoring systems (804), analyzing data received from the particular monitoring system irrespective of data received from the multiple other monitoring systems (806), based on the analysis, determining whether one or more events occur at the particular environment (808), and in response to determining that a particular event occurs at the particular environment, evaluating the particular event against a set of rules (810), selecting, based on the evaluation results, a particular subset of the multiple other monitoring systems to serve as a cooperative monitoring network (812), assessing data received from the particular monitoring system with data received from the particular subset of the multiple other monitoring systems (814), based on the assessment, tracking, in connection with the particular event, events detected by the particular subset of the multiple other monitoring systems (816), and handling the particular event based on the tracked events detected by the particular subset of the multiple other monitoring systems (818).

In more detail, the process 800 may include receiving data from a particular monitoring system that is managed by the electronic system, that is associated with a particular user, and that includes one or more components that sense attributes at a particular environment (802). This may, for instance, correspond to monitoring application server 160 and/or central alarm server 170 receiving data from monitoring system 108, which is associated with the user who owns the property on which portions of monitoring system 108 are located and includes one or more components 112, 114, 120, 122, 130, 140, and 150. Such a monitoring system may also be similar to the monitoring system of premises 210, as described above in reference to FIGS. 2A-C, or similar to the monitoring system of premises 312, as described above in reference to FIG. 3.

In some implementations, receiving data from the particular monitoring system that is managed by the electronic system and that is associated with the particular user may include receiving data from a particular monitoring system that is registered to a particular account managed by the electronic system. In these implementations, the particular user may, for instance, have access to the particular account. Such a particular account may, for example, correspond to an account held by the particular user in connection with security and/or automation services that are provided to the particular user through the monitoring system that is associated with the particular user and a monitoring application server and/or central alarm server, such as those described above in reference to FIGS. 2A-C. In some examples, one or more of the components of the particular monitoring system are fixed within a particular property that is owned by the particular user. In such examples, the particular environment may correspond to the particular property. Such a particular property may, for instance, at least in part correspond to premises 210. As such, the particular monitoring system may, in some implementations, be a security system of a residence that is located on the particular property.

The process 800 may include receiving data from multiple other monitoring systems that are managed by the electronic system, that are associated with multiple other users, and that each include one or more components that sense attributes external to the particular environment (804). For example, this may correspond to monitoring application server 160 and/or central alarm server 170 receiving data from multiple monitoring systems other than monitoring system 108, each of which may be similar to monitoring system 108N including one or more components 112N, 114N, 120N, 122N, 130N, 140N, and 150N. Such monitoring systems may also be similar to the monitoring systems of premises 220 and 230, as described above in reference to FIGS. 2A-C, or similar to those which are installed within premises 342a-d, as described above in reference to FIG. 3. In implementations in which the particular monitoring system is registered to the particular account, receiving data from multiple other monitoring systems that are managed by the electronic system and that are associated with multiple other users may, in some examples, include receiving data from multiple other monitoring systems that are registered to accounts managed by the electronic system other than the particular account.

The process 800 may include analyzing data received from the particular monitoring system irrespective of data received from the multiple other monitoring systems (806) and, based on the analysis, determining whether one or more events occur at the particular environment (808). This may, for instance, correspond to a monitoring application server and/or central alarm server, such as those described above in reference to FIGS. 1-4, analyzing the data produced by a monitoring system, in isolation, in order to provide one or more security services to the particular user.

The process 800 may include in response to determining that a particular event occurs at the particular environment, evaluating the particular event against a set of rules that are associated with the particular monitoring system (810) and selecting, based on the evaluation results and from among the multiple other monitoring systems, a particular subset of the multiple other monitoring systems to serve as a cooperative monitoring network that assists with monitoring of the particular event (812). For instance, this may correspond to a monitoring application server and/or central alarm server, such as those described above in reference to FIGS. 2A-C, evaluating the nature of the event detected at the monitoring system of premises 210 and, in turn, selecting the monitoring system of premises 220 to assist with monitoring the event. In some examples, the set of rules may include one or more rules having been defined by the particular user and consented to by other users that are associated with the particular subset of the multiple other monitoring systems. Such a set of rules may, for instance, include or be similar to one or more of the rules 600 as described above in reference to FIG. 6. For instance, the user that is associated with the monitoring system of premises 220, as described above in reference to FIGS. 2A-C, may have provided permission to include the monitoring system of premises 220 in a cooperative monitoring network with the monitoring system of premises 210.

The process 800 may include monitoring the particular event by assessing data received from the particular monitoring system with data received from the particular subset of the multiple other monitoring systems (814). This may, for instance, correspond to a monitoring application server and/or central alarm server, such as those described above in reference to FIGS. 2A-C, assessing data received from the monitoring system of premises 210 in conjunction with data, such as images 224a-b, received from the monitoring system of premises 220.

The process 800 may include, based on the assessment, tracking, in connection with the particular event, events detected by the particular subset of the multiple other monitoring systems external to the particular environment (816). For example, this may correspond to a monitoring application server and/or central alarm server, such as those described above in reference to FIGS. 2A-C, tracking the intruder 202, in connection with the intrusion event detected at the monitoring system of premises 210, using data, such as images 224a-b, received from the monitoring system of premises 220. In the examples of FIGS. 2A-C, a monitoring application server and/or central alarm server may further track events that are associated with intruder 202, and thus also associated with the intrusion event detected at the monitoring system of premises 210, based on the direction 214 in which the intruder 202 is determined to be moving. In performing this step of process 800, the system may reference criteria provided for property-specific events and cooperative events, such as those described above in reference to FIG. 7, so as to distinguish between events that are connected to the particular event (e.g., cooperative events) and events that are not connected to the particular event and instead relate only to specific monitoring systems in the cooperative monitoring network (e.g., property-specific events).

The process 800 may include handling the particular event based on the tracked events detected by the particular subset of the multiple other monitoring systems external to the particular environment (818). This may, for instance, correspond to a monitoring application server and/or central alarm server, such as those described above in reference to FIGS. 2A-C, performing one or more operations to promote awareness of the intrusion event detected at the monitoring system of premises 210 and the whereabouts of the intruder 202, so as to provide users with enhanced security and aid in the apprehension of intruder 202. In some examples, handling the particular event based on the tracked events detected by the particular subset of the multiple other monitoring systems external to the particular environment may include controlling one or more components of other monitoring systems included in the particular subset of the multiple other monitoring systems external to the particular environment based on the tracked events detected by the particular subset of the multiple other monitoring systems external to the particular environment. In such examples, functions of one or more components of monitoring systems included in the cooperative monitoring network may be controlled by a monitoring application server and/or central alarm server. For instance, a monitoring application server and/or central alarm server may activate one or more lighting systems or effect pan-tilt-zoom movements in camera systems of other monitoring systems in an effort to track events that are connected to the event initially detected and bring attention to emerging threats.

In some implementations, the process 800 may further include, in response to determining that the particular event occurs at the particular environment, generating a message about the particular event and transmitting the message to one or more client devices belonging to the particular user and one or more client devices belonging to other users that are associated with the particular subset of the multiple other monitoring systems. This may, for instance, correspond to a monitoring application server and/or central alarm server providing sending alerts and other notifications to users that are determined to be in geographic proximity to a detected event. By promoting awareness in this way, such users may be able to take extra precautions to protect themselves from emerging threats, or come to the aid of others in need of medical assistance or other help. Such client devices may function in a manner similar to devices 140 and 150, as described above in reference to FIG. 1, and may include smart phones, laptops, and the like.

In some examples, the one or more of the components of the particular monitoring system include a mobile device. In such examples, the particular environment may correspond to a location of the mobile device. This may, for instance, correspond to mobile device 404, as described above in reference to FIG. 4. In addition, selecting, based on the evaluation results and from among the multiple other monitoring systems, the particular subset of the multiple other monitoring systems to serve as a cooperative monitoring network that assists with monitoring of the particular event may, in some of such examples, include selecting, from among the multiple other monitoring systems, a particular subset of the multiple other monitoring systems to serve as a cooperative monitoring network that assists with monitoring of the particular event, based on the evaluation results and the location of the mobile device. For example, this may correspond to the monitoring application server and/or central alarm server, as described above in reference to FIG. 4, determining to form a cooperative monitoring network that at least includes monitoring system of premises 430 based on determining that that mobile device 404 and monitoring system of premises 430 are proximate to one another.

In some implementations, the process 800 may further include determining, based on data received from the particular monitoring system, that an entity is associated with the particular event and identifying one or more characteristics of the entity associated with the particular event. In such implementations, tracking, based on the assessment and in connection with the particular event, events detected by the particular subset of the multiple other monitoring systems external to the particular environment may include tracking, based on the assessment and in connection with the particular event, one or more movements of the entity detected by the particular subset of the multiple other monitoring systems external to the particular environment, using the one or more identified characteristics of the entity. This may, for instance, correspond to the monitoring application server and/or central alarm server, as described above in reference to FIGS. 2A-C, initially determining that an entity was responsible for the intrusion event detected at the monitoring system of premises 210, and further identifying one or more characteristics of intruder 202 so as to facilitate the tracking of intruder 202. The entity may, for instance, correspond to a person, animal, or vehicle. Such characteristics may be those of the entity's physical appearance, movements, and the like. To facilitate entity tracking, one or more models or templates may be developed on-the-fly based on such characteristics and leveraged by a monitoring application server and/or central alarm server to determine whether data received from any monitoring system included in a cooperative monitoring network conveys the presence of likeness of the entity of interest. In these implementations, any of a variety of signal processing techniques may be utilized for the identification and recognition of characteristics of entities.

In addition, determining that the particular event occurs at the particular environment may, in some of such implementations, include determining that a property of the particular user has been breached, where the entity corresponds to an intruder of the property of the particular user. This may, for instance, correspond to the example described above in reference to FIGS. 2A-C. In another example, determining that the particular event occurs at the particular environment may, in some of such implementations, include determining that a person or animal associated with the particular user has gone missing, where the entity corresponds to the person or animal associated with the particular user. For instance, this may correspond examples in which the particular user's child or pet has gone missing, and a cooperative monitoring network is leveraged in an effort to find the lost child or pet.

In some examples, determining, based on the analysis, that a particular event occurs at the particular environment may include determining, based on the analysis, that the particular monitoring system is experiencing a malfunction. In such examples, assessing data received from the particular monitoring system with data received from the particular subset of the multiple other monitoring systems may include determining whether other monitoring systems in the particular subset of the multiple other monitoring systems are experiencing the malfunction. This may, for instance, correspond to one or more steps of process 500, as described above in reference to FIG. 5, as performed by the system to address malfunctions including phone line failure, power failure, radio-frequency communication failure, and abnormalities in readings from solar panels and other transducers. In some implementations, the malfunction, in some of these examples, may correspond to a radio-frequency communication failure between one or more monitoring system components. In such implementations, the process 800 may further include determining that other monitoring systems in the particular subset of the multiple other monitoring systems are experiencing radio-frequency communication failures between one or more monitoring system components and, in response to determining that other monitoring systems in the particular subset of the multiple other monitoring systems are experiencing radio-frequency communication failures between one or more monitoring system components, determining that radio-frequency communication channels used by the particular monitoring system and other monitoring systems in the particular subset of the multiple other monitoring systems are being jammed. For example, this may correspond to process 500, at 508 to 512, as described above in reference to FIG. 5.

In some implementations, the process 800 may further include, based on tracking events detected by the particular subset of the multiple other monitoring systems external to the particular environment, modifying the cooperative monitoring network to (i) add one or more monitoring systems to the cooperative monitoring network, and (ii) remove one or more existing monitoring systems from the cooperative monitoring network. This may, for instance, correspond to the monitoring application server and/or central alarm server, as described above in reference to FIGS. 2A-C, determining to add the monitoring system of premises 230 to the cooperative monitoring network that is assisting in the monitoring of events stemming from or otherwise associated with the intrusion event detected at the monitoring system of premises 210, such as those that occur as intruder 202 flees premises 210. Cooperative monitoring network modifications may, in the example of FIGS. 2A-C, continue to take place so as to track the intruder 202. As described above in the example of FIG. 3, cooperative monitoring network modifications may also take place as a function of time. For example, a cooperative monitoring network may progressively expand outwards from the monitoring system located at the epicenter of a detected event so as to provide increasing awareness of the detected event while it remains unresolved and/or becomes increasingly more urgent.

Figure 9:
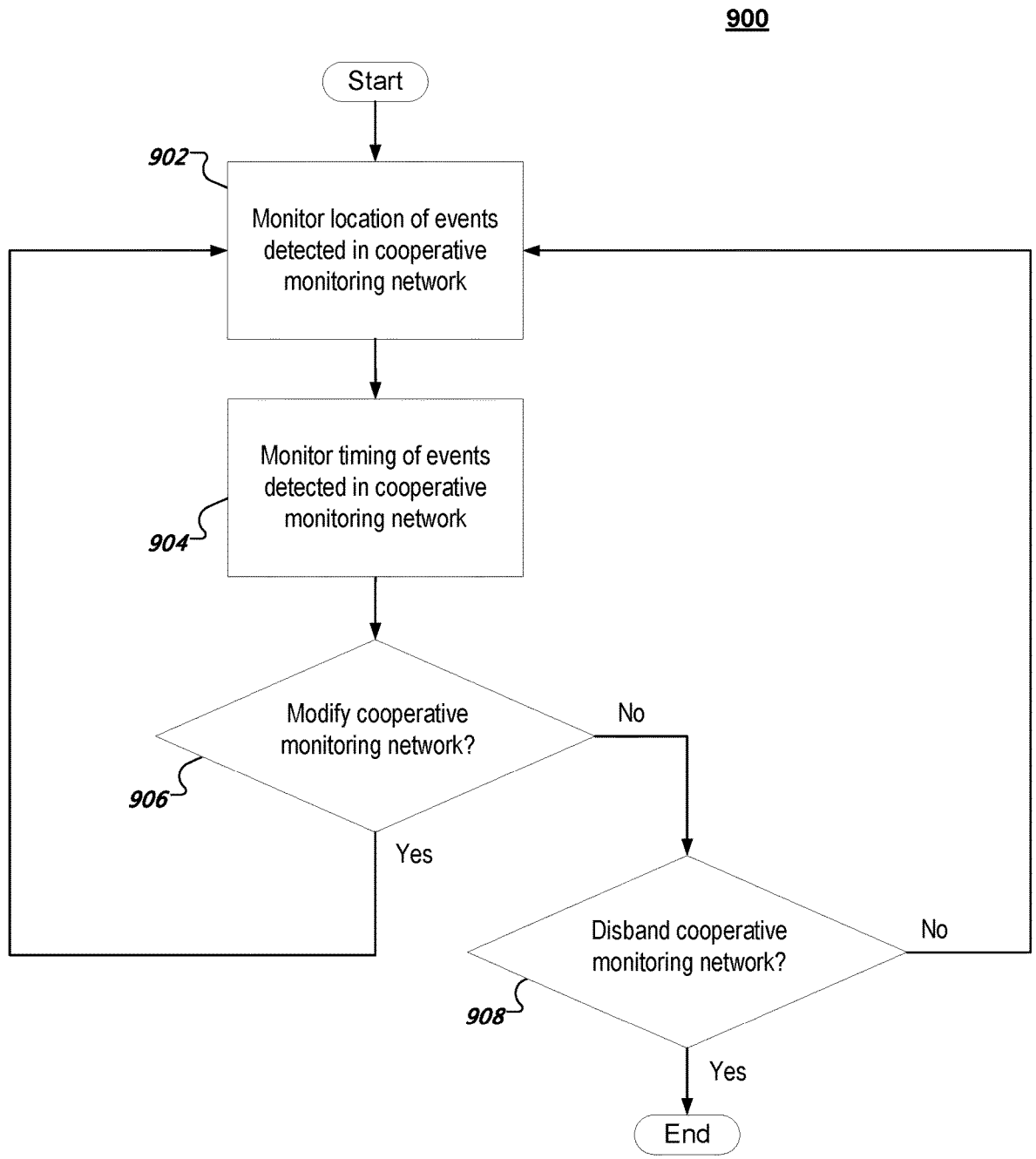

FIG. 9 is a flowchart of an example of a process 900 for modifying cooperative monitoring network. The following describes the process 900 as being performed by components of systems that are described with reference to FIGS. 1-4. However, the process 900 may be performed by other systems or system configurations. The process 900 may, for instance, be similar to one or more operations that are performed by a monitoring application server and/or central alarm server in implementing a cooperative monitoring network adaptation schemes, such as an adaptation scheme 603 as described above in reference to FIG. 6.

Execution of the process 900 may, for instance, be initiated after a cooperative monitoring network has been formed, and while the monitoring application server and/or central alarm server is leveraging the cooperative monitoring network to monitor an event. At 902, the system may monitor the location of events detected in the cooperative monitoring network. For instance, the monitoring application server and/or central alarm server may analyze the location at which each of one or more events detected at monitoring systems in the cooperative monitoring network occur. At 904, the system may monitor the timing of events detected in the cooperative monitoring network. Based at least on the location and timing of such detected events, the system may, at 906, determine whether to modify the cooperative monitoring network.

The system may, for instance, determine to remove an existing monitoring system from the cooperative monitoring network if it is determined that the data that is being provided by the existing monitoring system is no longer of relevance. Such a determination may be made based on the system not having detected any events at the existing monitoring system for an extended period of time, and further detecting a multitude of relevant events at other monitoring systems in the cooperative monitoring network that substantially distant from the existing monitoring system. Likewise, the system may also determine that a monitoring system that is not currently included in the cooperative monitoring network be added to the cooperative monitoring network. Such a determination may, for instance, be made based on the location and/or movements of an entity of interest that is being tracked. In some examples, this determination may be made based on one or more predictions regarding the route that is being taken by the entity of interest that is being tracked. As described above, one or more machine learning techniques may be leveraged to obtain one or more of such route predictions. For instance, the system may generate, maintain, and modify one or more statistical models using one or more machine learning techniques, such as supervised learning, unsupervised learning, and/or reinforcement learning. Such statistical models may, in some implementations, include artificial neural network and logistic regression models that are leveraged by the system to obtain route predictions and/or other insights, and proactively modify cooperative monitoring networks on the basis of such route predictions and/or other insights. If it is determined that the cooperative monitoring network is to be modified, then the system may proceed to make the necessary modifications and then, once again, perform the steps of process 900 from the beginning.

If, however, the system determines not to modify the cooperative monitoring network at 906, the system may then proceed to determine, at 908, whether to disband the cooperative monitoring network. The system may, for instance, determine to disband a cooperative monitoring network once one or more issues associated with the detected event are resolved. For example, the system may determine to disband a cooperative monitoring network that had been tracking an entity of interest in connection with an intrusion event upon determining that the entity of interest has been apprehended by the authorities. In another example, the system may determine to disband a cooperative monitoring network upon completely losing all track of an entity on the move. In yet another example, the system may determine to disband a cooperative monitoring network upon losing the ability to adequately discern differences between "property-specific" events and "cooperative" events. The system might encounter such a situation if monitoring systems included in multiple, different cooperative monitoring networks at the same time, so as to assist with monitoring of multiple, different events that are occurring simultaneously. It follows that, upon determining whether to disband the cooperative monitoring network at 908, the system may, in response, proceed with either disbanding the cooperative monitoring network or performing the steps of process 900, once again, from the beginning.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system comprising:
   at least one processor; and
   at least one computer-readable storage medium coupled to the at least one processor having stored thereon instructions which, when executed by the at least one processor, causes the at least one processor to perform operations comprising:
      receiving, by an application server, first data from a first monitoring system, wherein the first monitoring system is configured to monitor data generated by one or more first sensors or one or more first cameras located at a first property;
      determining, by the application server and based on the received first data, that an alarm event has occurred at the first property;
      activating, by the application server, a cooperative network between the first monitoring system and a second monitoring system; and
      using, by the application server, second data obtained from the second monitoring system to monitor the alarm event at the first property, wherein the second monitoring system is configured to monitor data generated by one or more second sensors or one or more second cameras located at a second property.

2. The system of claim 1,
   wherein using, by the application server, second data obtained from the second monitoring system to monitor the alarm event at the first property comprises:
      determining, by the application server, an attribute of the first property based on the obtained second data.

3. The system of claim 1,
   wherein the obtained second data includes image data generated by the one or more second cameras, and
   wherein using, by the application server, second data obtained from the second monitoring system to monitor the alarm event at the first property comprises:
      determining, by the application server, an attribute of the first property based on the image data that is generated by the one or more second cameras.

4. The system of claim 3,
   wherein the image data includes (i) one or more still images or (ii) one or more video images captured by the one or more second cameras.

5. The system of claim 1, wherein the second monitoring system of the second property is selected for inclusion in the cooperative network based on the geographic proximity of the second property to the first property.

6. The system of claim 1, wherein using, by the application server, second data obtained from the second monitoring system to monitor the alarm event at the first property comprises:
   determining, by the application server, a trajectory of a moving object based on the first data and the second data.

7. The system of claim 6, the operations further comprising:
   determining, by the application server, that the trajectory of the moving object indicates that the moving object is moving towards a third property; and
   responsive to a determination that the trajectory of the moving object indicates that the moving object is moving towards the third property, adding a third monitoring system to the cooperative network, wherein the third local monitoring system is configured to monitor data generated by one or more third sensors or one or more third cameras located at the third property.

8. A method comprising:
receiving, by an application server, first data from a first monitoring system, wherein the first monitoring system is configured to monitor data generated by one or more first sensors or one or more first cameras located at a first property;
determining, by the application server and based on the received first data, that an alarm event has occurred at the first property;
activating, by the application server, a cooperative network between the first monitoring system and a second monitoring system; and
using, by the application server, second data obtained from the second monitoring system to monitor the alarm event at the first property, wherein the second monitoring system is configured to monitor data generated by one or more second sensors or one or more second cameras located at a second property.

9. The method of claim 8,
wherein using, by the application server, second data obtained from the second monitoring system to monitor the alarm event at the first property comprises:
determining, by the application server, an attribute of the first property based on the obtained second data.

10. The method of claim 8,
wherein the obtained second data includes image data generated by the one or more second cameras, and
wherein using, by the application server, second data obtained from the second monitoring system to monitor the alarm event at the first property comprises:
determining, by the application server, an attribute of the first property based on the image data that is generated by the one or more second cameras.

11. The method of claim 8, wherein the second monitoring system of the second property is selected for inclusion in the cooperative network based on the geographic proximity of the second property to the first property.

12. The method of claim 8, using, by the application server, second data obtained from the second monitoring system to monitor the alarm event at the first property comprises:
determining, by the application server, a trajectory of a moving object based on the first data and the second data.

13. The method of claim 12, the further comprising:
determining, by the application server, that the trajectory of the moving object indicates that the moving object is moving towards a third property; and
responsive to a determination that the trajectory of the moving object indicates that the moving object is moving towards the third property, adding a third monitoring system to the cooperative network, wherein the third local monitoring system is configured to monitor data generated by one or more third sensors or one or more third cameras located at the third property.

14. A non-transitory computer-readable medium having stored thereon instructions, which, when executed by one or more computers, cause the one or more computers to perform operations of:
receiving, by an application server, first data from a first monitoring system, wherein the first monitoring system is configured to monitor data generated by one or more first sensors or one or more first cameras located at a first property;
determining, by the application server and based on the received first data, that an alarm event has occurred at the first property;
activating, by the application server, a cooperative network between the first monitoring system and a second monitoring system; and
using, by the application server, second data obtained from the second monitoring system to monitor the alarm event at the first property, wherein the second monitoring system is configured to monitor data generated by one or more second sensors or one or more second cameras located at a second property.

15. The computer-readable medium of claim 14,
wherein using, by the application server, second data obtained from the second monitoring system to monitor the alarm event at the first property comprises:
determining, by the application server, an attribute of the first property based on the obtained second data.

16. The computer-readable medium of claim 14,
wherein the obtained second data includes image data generated by the one or more second cameras, and
wherein using, by the application server, second data obtained from the second monitoring system to monitor the alarm event at the first property comprises:
determining, by the application server, an attribute of the first property based on the image data that is generated by the one or more second cameras.

17. The computer-readable medium of claim 16,
wherein the image data includes (i) one or more still images or (ii) one or more video images captured by the one or more second cameras.

18. The computer-readable medium of claim 14, wherein the second monitoring system of the second property is selected for inclusion in the cooperative network based on the geographic proximity of the second property to the first property.

19. The computer-readable medium of claim 14, wherein using, by the application server, second data obtained from the second monitoring system to monitor the alarm event at the first property comprises:
determining, by the application server, a trajectory of a moving object based on the first data and the second data.

20. The computer-readable medium of claim 19, the operations further comprising:
determining, by the application server, that the trajectory of the moving object indicates that the moving object is moving towards a third property; and
responsive to a determination that the trajectory of the moving object indicates that the moving object is moving towards the third property, adding a third monitoring system to the cooperative network, wherein the third local monitoring system is configured to monitor data generated by one or more third sensors or one or more third cameras located at the third property.

* * * * *